US012777179B2

(12) United States Patent
Zhang et al.

(10) Patent No.: US 12,777,179 B2
(45) Date of Patent: Oct. 27, 2026

(54) MOTION VECTOR DIFFERENCE FOR BLOCK WITH GEOMETRIC PARTITION

(71) Applicants: Beijing Bytedance Network Technology Co., Ltd., Beijing (CN); Bytedance Inc., Los Angeles, CA (US)

(72) Inventors: Kai Zhang, San Diego, CA (US); Li Zhang, San Diego, CA (US); Hongbin Liu, Beijing (CN); Zhipin Deng, Beijing (CN); Yue Wang, Beijing (CN)

(73) Assignees: Beijing Bytedance Network Technology Co., Ltd, Beijing (CN); Bytedance Inc., Los Angeles, CA (US)

( * ) Notice: Subject to any disclaimer, the term of this patent is extended or adjusted under 35 U.S.C. 154(b) by 73 days.

(21) Appl. No.: 18/745,471

(22) Filed: Jun. 17, 2024

(65) Prior Publication Data

US 2024/0340439 A1 Oct. 10, 2024

Related U.S. Application Data

(63) Continuation of application No. 17/961,413, filed on Oct. 6, 2022, now Pat. No. 12,034,966, which is a (Continued)

(30) Foreign Application Priority Data

Apr. 9, 2020 (WO) ................ PCT/CN2020/083916

(51) Int. Cl.
*H04N 19/52* (2014.01)
*H04N 19/176* (2014.01)

(Continued)

(52) U.S. Cl.
CPC ........... *H04N 19/52* (2014.11); *H04N 19/176* (2014.11); *H04N 19/184* (2014.11); *H04N 19/66* (2014.11); *H04N 19/70* (2014.11)

(58) Field of Classification Search
CPC .... H04N 19/52; H04N 19/176; H04N 19/184; H04N 19/66; H04N 19/70
See application file for complete search history.

(56) References Cited

U.S. PATENT DOCUMENTS 10,250,908 B2 4/2019 Chen
12,034,966 B2 7/2024 Zhang (Continued)

FOREIGN PATENT DOCUMENTS

CN 102215395 A 10/2011
CN 109417631 A 3/2019

(Continued)

OTHER PUBLICATIONS

Document: JVET-R0282-r1, Panusopone K., et al., "GEO with MMVD," Joint Video Experts Team (JVET) of ITU-T SG 16 WP 3 and ISO/IEC JTC 1/SC 29/WG 11 18th Meeting: by teleconference, Apr. 15-24, 2020, 3 pages.

(Continued)

*Primary Examiner* — Richard T Torrente
(74) *Attorney, Agent, or Firm* — Conley Rose, P.C.

(57) ABSTRACT

A method of video processing includes determining, for a conversion between a current video block of a video and a bitstream of the video, that the current video block is coded with a geometric partitioning mode. The method further includes deriving at least one refined motion vector (MV) for the current video block by adding at least one motion vector difference (MVD) of multiple MVDs signaled or derived for the current video block to a MV derived from a merge candidate associated with the current video block. The MV being associated with an offset distance and/or an offset direction. The method further includes performing the conversion based on the refined MV.

17 Claims, 19 Drawing Sheets

Related U.S. Application Data continuation of application No. PCT/CN2021/085914, filed on Apr. 8, 2021.

(51) Int. Cl.

| | |
|---|---|
| ***H04N 19/184*** | (2014.01) |
| ***H04N 19/66*** | (2014.01) |
| ***H04N 19/70*** | (2014.01) |

(56) References Cited

U.S. PATENT DOCUMENTS

| | | | | |
|---|---|---|---|---|
| 2020/0169757 | A1 | 5/2020 | Chiang | |
| 2020/0195973 | A1 | 6/2020 | Xu | |
| 2020/0221108 | A1 | 7/2020 | Xu | |
| 2020/0374528 | A1* | 11/2020 | Huang | H04N 19/176 |
| 2020/0404253 | A1 | 12/2020 | Chen | |
| 2020/0413089 | A1 | 12/2020 | Liao | |
| 2021/0314623 | A1* | 10/2021 | Chang | H04N 19/159 |
| 2022/0021900 | A1 | 1/2022 | Jeong | |
| 2022/0078488 | A1 | 3/2022 | Leleannec | |
| 2022/0264136 | A1* | 8/2022 | Chen | H04N 19/159 |

FOREIGN PATENT DOCUMENTS

| | | | |
|---|---|---|---|
| CN | 110557640 | A | 12/2019 |
| CN | 110574372 | A | 12/2019 |
| CN | 110662039 | A | 1/2020 |
| CN | 110662041 | A | 1/2020 |
| CN | 110933408 | A | 3/2020 |
| CN | 110944191 | A | 3/2020 |
| WO | 2019151284 | A | 8/2019 |
| WO | 2019194497 | A1 | 10/2019 |

OTHER PUBLICATIONS

Gao et al. "Simplified GEO without Multiplication and Minimum Blending Mask Storage {Harmonization of JVET-P0107, JVET-P0264 and JVET-P0304)," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P0884, 2019.

Jeong S., et al., "CE4 Ultimate Motion Vector Expression (Test 4.5.4)," Joint Video Experts Team (JVET) of ITU-T SG 16 WP 3 and ISO/IEC JTC 1/SC 29/WG 11, 12th Meeting: Macao, CN, Oct. 3-12, 2018, Document JVET-L0054, 28 Pages.

Document: JVET-P0884-v5, Gao, H., et al., "Simplified GEO without multiplication and minimum blending mask storage (harmonization of JVET-P01078, JVET-P0264 and JVET-P0304)," Joint Video Experts Team (JVET) of ITU-T SG 16 WP 3 and ISO/IEC JTC 1/SC 29/WG 11 16th Meeting: Geneva, CH, Oct. 1-11, 2019, 9 pages.

Document: JVET-P0107-v3, Gao, H., et al., "CE4-Related: Geometric Merge Mode (GEO) Simplifications," Joint Video Experts Team (JVET) of ITU-T SG 16 WP 3 and ISO/IEC JTC 1/SC 29/WG 11 16th Meeting: Geneva, CH, Oct. 1-11, 2019, 9 pages.

Document: JVET-P0304-v2, Liao, R., et al., "CE4-related: Simplification of blending weights and motion field storage in geometric merge mode," Joint Video Experts Team (JVET) of ITU-T SG 16 WP 3 and ISO/IEC JTC 1/SC 29/WG 11 16th Meeting: Geneva, CH, Oct. 1-11, 2019, 7 pages.

Document: JVET-P0264-v4, Reuze, K., et al., "CE4-related: Simplification of GEO using angles with power-of-two tangents," Joint Video Experts Team (JVET) of ITU-T SG 16 WP 3 and ISO/IEC JTC 1/SC 29/WG 11 16th Meeting: Geneva, CH, Oct. 1-11, 2019, 7 pages.

Document: JVET-L0054, Jeong, S., et al., "CE4 Ultimate motion vector expression (Test 4.5.4)," Joint Video Experts Team (JVET) of ITU-T SG 16 WP 3 and ISO/IEC JTC 1/SC 29/WG 11 12th Meeting: Macao, CN, Oct. 3-12, 2018, 6 pages.

Document: JVET-P2001-vE, Bross, B., et al., "Versatile Video Coding (Draft 7)," Joint Video Experts Team (JVET) of ITU-T SG 16 WP 3 and ISO/IEC JTC 1/SC 29/WG 11 16th Meeting: Geneva, CH, Oct. 1-11, 2019, 491 pages.

Document: JVET-P0305-v2, Liao, R., et al., "CE4-related: Unification of triangle partition mode and geometric merge mode," Joint Video Experts Team (JVET) of ITU-T SG 16 WP 3 and ISO/IEC JTC 1/SC 29/WG 11 16th Meeting: Geneva, CH, Oct. 1-11, 2019, 7 pages.

Document: JVET-Q0315, Zhang, K., et al., "Non-CE4: Triangular prediction mode with motion vector difference," Joint Video Experts Team (JVET) of ITU-T SG 16 WP 3 and ISO/IEC JTC 1/SC 29/WG 11 17th Meeting: Brussels, BE, Jan. 7-17, 2020, 2 pages.

Document: JVET-M0736, Blaser, M., et al., "CE10-related: Triangular prediction with MMVD," Joint Video Experts Team (JVET) of ITU-T SG 16 WP 3 and ISO/IEC JTC 1/SC 29/WG 11 13th Meeting: Marrakech, MA, Jan. 9-18, 2019, 4 pages.

Non-Final Office Action from U.S. Appl. No. 17/853,076 dated Mar. 20, 2024, 14 pages.

International Search Report from PCT Application No. PCT/CN2020/141332 dated Mar. 19, 2021, 10 pages.

Notice of Allowance from U.S. Appl. No. 17/961,413 dated Feb. 28, 2024, 26 pages.

International Search Report from PCT Application No. PCT/CN2021/085914 dated Jul. 8, 2021, 9 pages.

Non-Final Office Action for U.S. Appl. No. 17/853,076, mailed Nov. 21, 2024, 13 pages.

Chinese Office Action from Chinese Patent Application No. 202180026287.3 dated Apr. 30, 2025, 11 pages.

Chinese Office Action from Chinese Patent Application No. 202080091761.6 dated Mar. 5, 2025, 22 pages.

* cited by examiner

MOTION VECTOR DIFFERENCE FOR BLOCK WITH GEOMETRIC PARTITION

CROSS-REFERENCE TO RELATED APPLICATION

This application is a continuation of U.S. patent application Ser. No. 17/961,413 filed on Oct. 6, 2022, which is a continuation of International Patent Application No. PCT/CN2021/085914, filed on Apr. 8, 2021, which claims the priority to and benefits of International Patent Application PCT/CN2020/083916, filed on Apr. 9, 2020. All the aforementioned patent applications are hereby incorporated by reference in their entireties.

TECHNICAL FIELD

This patent document relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present document discloses techniques that can be used by video encoders and decoders to perform cross-component adaptive loop filtering during video encoding or decoding.

In one example aspect, a video processing method is disclosed. The method includes partitioning, for a conversion between a video unit of a video and a coded representation of the video, the video into multiple partitions. The method also includes performing the conversion based on the multiple partitions using a merge with motion vector difference mode for at least some of the multiple partitions.

In another example aspect, another video processing method is disclosed. The method includes partitioning, for a conversion between a video unit of a video and a coded representation of the video, the video into multiple partitions. The method also includes performing the conversion based on the multiple partitions. The coded representation comprises fields indicative of motion vector difference values using one or more of two variables corresponding to a direction and a magnitude of the motion vector difference values.

In another example aspect, another video processing method is disclosed. The method includes partitioning, for a conversion between a video unit of a video and a coded representation of the video, the video into multiple partitions. The method also includes performing the conversion based on the multiple partitions wherein the coded representation comprises fields in an order.

In another example aspect, another video processing method is disclosed. The method includes determining, for a conversion between a current video block of a video and a bitstream of the current video, that the current video block is coded with a geometric partitioning mode. The method also includes deriving at least one refined motion vector (MV) for the current video block by adding at least one motion vector difference (MVD) of multiple MVDs signaled or derived for the current video block to a MV derived from a merge candidate associated with the current video block. The method also includes performing the conversion based on the refined MV.

In another example aspect, a method for storing bitstream of a video is disclosed. The method includes determining, for a conversion between a current video block of a video and a bitstream of the current video, that the current video block is coded with a geometric partitioning mode. The method also includes deriving at least one refined motion vector (MV) for the current video block by adding at least one motion vector difference (MVD) of multiple MVDs signaled or derived for the current video block to a MV derived from a merge candidate associated with the current video block. The method also includes generating the bitstream from the current video block based on the refined MV. The method also includes storing the bitstream in a non-transitory computer-readable recording medium.

In another example aspect, another video processing method is disclosed. The method includes determining, for a conversion between a current video block of a video and a bitstream of the video, that the current video block is coded with a geometric partitioning mode. The method also includes deriving at least one refined motion vector (MV) for the current video block by adding at least one motion vector difference (MVD) of multiple MVDs signaled or derived for the current video block to a MV derived from a merge candidate associated with the current video block. The MV being associated with an offset distance and/or an offset direction. The method also includes performing the conversion based on the refined MV.

In another example aspect, another video processing method is disclosed. The method includes determining, for a conversion between a current video block of a video and a bitstream of the video, that the current video block is coded with a geometric partitioning mode. The method also includes determining whether a geometric motion vector difference coding method is enabled or disabled. The geometric motion vector difference coding method derives at least one refined motion vector (MV) for the current video block by adding at least one motion vector difference (MVD) of multiple MVDs signaled or derived for the current video block to a MV derived from a merge candidate associated with the current video block. The method also includes performing the conversion based on the refined MV.

In another example aspect, a method for storing bitstream of a video is disclosed. The method includes determining, for a conversion between a current video block of a video and a bitstream of the video, that the current video block is coded with a geometric partitioning mode. The method also includes determining whether a geometric motion vector difference coding method is enabled or disabled. The geometric motion vector difference coding method derives at least one refined motion vector (MV) for the current video block by adding at least one motion vector difference (MVD) of multiple MVDs signaled or derived for the current video block to a MV derived from a merge candidate associated with the current video block. The method also includes generating the bitstream from the current video block based on the refined MV. The method also includes storing the bitstream in a non-transitory computer-readable recording medium.

In yet another example aspect, a video encoder apparatus is disclosed. The video encoder comprises a processor configured to implement above-described methods.

In yet another example aspect, a video decoder apparatus is disclosed. The video decoder comprises a processor configured to implement above-described methods.

In yet another example aspect, a computer readable medium having code stored thereon is disclose. The code embodies one of the methods described herein in the form of processor-executable code.

These, and other, features are described throughout the present document.

DETAILED DESCRIPTION

Figure 1:
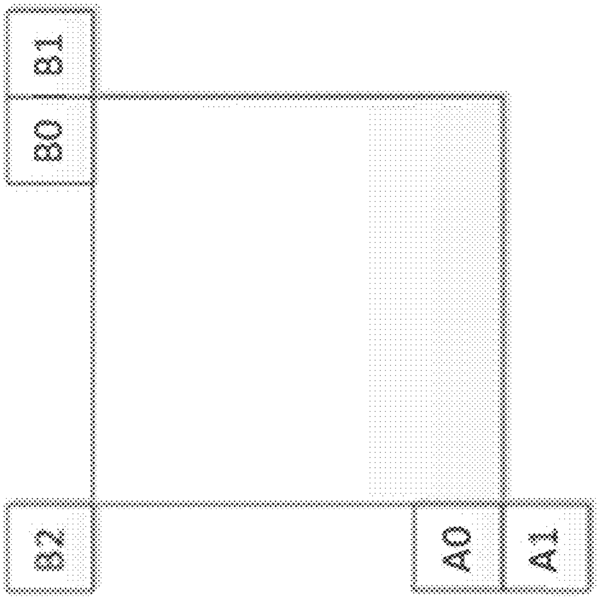
FIG. 1 shows example positions of spatial merge candidate.

Section headings are used in the present document for case of understanding and do not limit the applicability of techniques and embodiments disclosed in each section only to that section. Furthermore, H.266 terminology is used in some description only for case of understanding and not for limiting scope of the disclosed techniques. As such, the techniques described herein are applicable to other video codec protocols and designs also.

1. Summary

This document is related to video coding technologies. Specifically, it is about inter prediction and related techniques in video coding. It may be applied to the existing video coding standard like High Efficiency Video Coding (HEVC), or the standard Versatile Video Coding (VVC) to be finalized. It may be also applicable to future video coding standards or video codec.

2. Background

Video coding standards have evolved primarily through the development of the well-known International Telecommunication Union-Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by Video Coding Experts Group (VCEG) and MPEG jointly in 2015. Since then, many new methods have been adopted by JVET and put into the reference software named Joint Exploration Model (JEM). The JVET meeting is concurrently held once every quarter, and the new coding standard is targeting at 50% bitrate reduction as compared to HEVC. The new video coding standard was officially named as Versatile Video Coding (VVC) in the April 2018 JVET meeting, and the first version of VVC test model (VTM) was released at that time. As there are continuous effort contributing to VVC standardization, new coding techniques are being adopted to the VVC standard in every JVET meeting. The VVC working draft and test model VTM are then updated after every meeting. The VVC project is now aiming for technical completion Final Draft International Standard (FDIS) at the July 2020 meeting.

2.1. Extended Merge Prediction

In VTM, the merge candidate list is constructed by including the following five types of candidates in order:

1) Spatial motion vector prediction (MVP) from spatial neighbour coding units (CUs)
2) Temporal MVP from collocated CUs
3) History-based MVP from a first-in-first-out (FIFO) table
4) Pairwise average MVP
5) Zero motion vectors (MVs).

The size of merge list is signaled in slice header and the maximum allowed size of merge list is 6 in VTM. For each CU code in merge mode, an index of best merge candidate is encoded using truncated unary (TU) binarization. The first bin of the merge index is coded with context and bypass coding is used for other bins.

The generation process of each category of merge candidates is provided in this session.

2.1.1. Spatial Candidates Derivation

The derivation of spatial merge candidates in VVC is same to that in HEVC. A maximum of four merge candidates are selected among candidates located in the positions depicted in FIG. 1. The order of derivation is $A_0$, $B_0$, $B_1$, $A_1$ and $B_2$. Position $B_2$ is considered only when any CU of position $A_0$, $B_0$, $B_1$, $A_1$ is not available (e.g., because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 2 are considered and a candidate is only added to the list if the corresponding candidate used for redundancy check has not the same motion information.

FIG. 1 shows example positions of spatial merge candidate.

Figure 2:
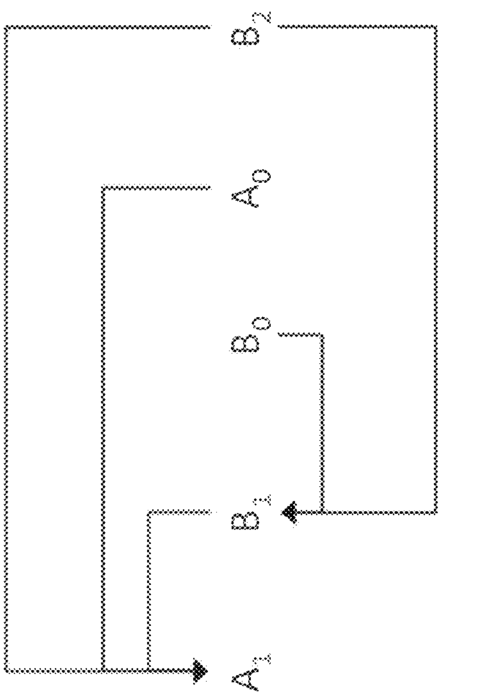
FIG. 2 shows examples of candidate pairs considered for redundancy check of spatial merge candidates.

FIG. 2 shows examples of candidate pairs considered for redundancy check of spatial merge candidates.

2.1.2. Temporal Candidates Derivation

In this step, only one candidate is added to the list. Particularly, in the derivation of this temporal merge candidate, a scaled motion vector is derived based on co-located CU belonging to the collocated reference picture. The reference picture list to be used for derivation of the co-located CU is explicitly signaled in the slice header. The scaled motion vector for temporal merge candidate is obtained as illustrated by the dotted line in FIG. 3, which is scaled from the motion vector of the co-located CU using the picture order count (POC) distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero.

Figure 3:
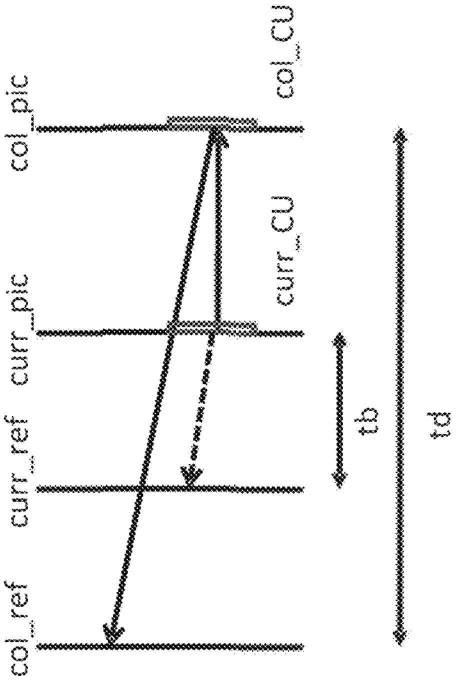
FIG. 3 is an illustration of motion vector scaling for temporal merge candidate, in accordance with various examples.

FIG. 3 is an illustration of motion vector scaling for temporal merge candidate.

Figure 4:
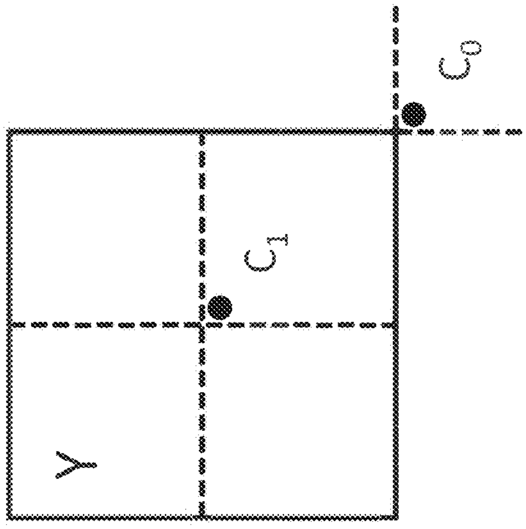
FIG. 4 shows examples of candidate positions for temporal merge candidate, C0 and C1.

The position for the temporal candidate is selected between candidates $C_0$ and $C_1$, as depicted in FIG. 4. If CU at position $C_0$ is not available, is intra coded, or is outside of the current row of CTUs, position $C_1$ is used. Otherwise, position $C_0$ is used in the derivation of the temporal merge candidate.

2.1.3. History-Based Merge Candidates Derivation

The history-based MVP (HMVP) merge candidates are added to merge list after the spatial MVP and temporal motion vector prediction (TMVP). In this method, the motion information of a previously coded block is stored in a table and used as MVP for the current CU. The table with multiple HMVP candidates is maintained during the encoding/decoding process. The table is reset (e.g., emptied) when a new coding tree unit (CTU) row is encountered. Whenever there is a non-subblock inter-coded CU, the associated motion information is added to the last entry of the table as a new HMVP candidate.

In VTM the HMVP table size S is set to be 6, which indicates up to 6 History-based MVP (HMVP) candidates may be added to the table. When inserting a new motion candidate to the table, a constrained first-in-first-out (FIFO) rule is utilized wherein redundancy check is firstly applied to find whether there is an identical HMVP in the table. If found, the identical HMVP is removed from the table and all the HMVP candidates afterwards are moved forward.

HMVP candidates could be used in the merge candidate list construction process. The latest several HMVP candidates in the table are checked in order and inserted to the candidate list after the TMVP candidate. Redundancy check is applied on the HMVP candidates to the spatial or temporal merge candidate.

To reduce the number of redundancy check operations, the following simplifications are introduced:

1. Number of HMPV candidates is used for merge list generation is set as (N<=4)? M: (8−N), wherein N indicates number of existing candidates in the merge list and M indicates number of available HMVP candidates in the table.
2. Once the total number of available merge candidates reaches the maximally allowed merge candidates minus 1, the merge candidate list construction process from HMVP is terminated.

2.1.4. Pair-Wise Average Merge Candidates Derivation

Pairwise average candidates are generated by averaging predefined pairs of candidates in the existing merge candidate list, and the predefined pairs are defined as {(0, 1), (0, 2), (1, 2), (0, 3), (1, 3), (2, 3)}, where the numbers denote the merge indices to the merge candidate list. The averaged motion vectors are calculated separately for each reference list. If both motion vectors are available in one list, these two motion vectors are averaged even when they point to different reference pictures; if only one motion vector is available, use the one directly; if no motion vector is available, keep this list invalid.

When the merge list is not full after pair-wise average merge candidates are added, the zero MVPs are inserted in the end until the maximum merge candidate number is encountered.

2.2. Triangle Partition for Inter Prediction

In VTM, a triangle partition mode (TPM) is supported for inter prediction. The triangle partition mode is only applied to CUs that are 64 samples or larger and are coded in skip or merge mode but not in a regular merge mode, or merge mode with motion vector difference (MMVD) mode, or combination of intra and inter prediction (CIIP) mode or subblock merge mode. A CU-level flag is used to indicate whether the triangle partition mode is applied or not.

Figure 5:
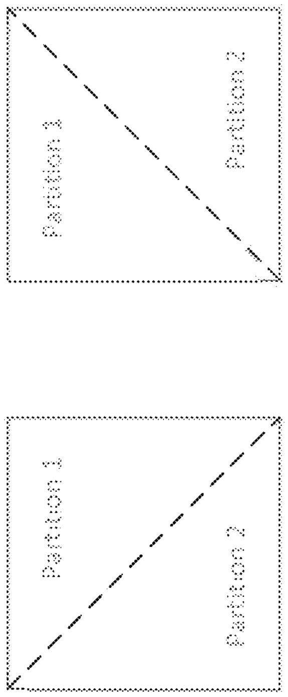
FIG. 5 shows an example of a triangle partition based inter prediction.

When this mode is used, a CU is split evenly into two triangle-shaped partitions, using either the diagonal split or the anti-diagonal split (FIG. 5). Each triangle partition in the CU is inter-predicted using its own motion; only uni-prediction is allowed for each partition, that is, each partition has one motion vector and one reference index. The uni-prediction motion constraint is applied to ensure that same as the conventional bi-prediction, only two motion compensated prediction are needed for each CU. The uni-prediction motion for each partition is derived directly the merge candidate list constructed for extended merge prediction in 2.1, and the selection of a uni-prediction motion from a given merge candidate in the list is according to the procedure in 2.2.1.

If triangle partition mode is used for a current CU, then a flag indicating the direction of the triangle partition (diagonal or anti-diagonal), and two merge indices (one for each partition) are further signaled. After predicting each of the triangle partitions, the sample values along the diagonal or anti-diagonal edge are adjusted using a blending processing with adaptive weights. This is the prediction signal for the whole CU, and transform and quantization process will be applied to the whole CU as in other prediction modes. Finally, the motion field of a CU predicted using the triangle partition mode is stored in 4×4 units as in 2.2.3.

2.2.1. Uni-Prediction Candidate List Construction

Figure 6:
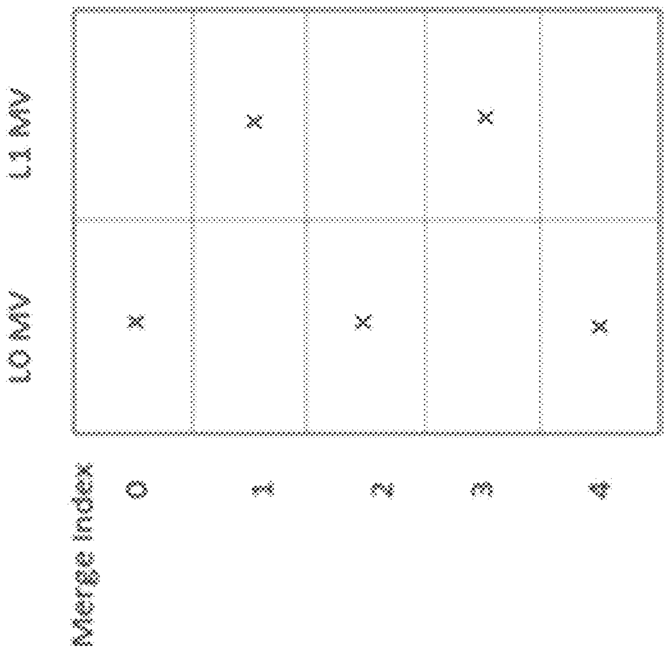
FIG. 6 shows an example of a uni-prediction motion vector (MV) selection for triangle partition mode.

Given a merge candidate index, the uni-prediction motion vector is derived from the merge candidate list constructed for extended merge prediction using the process in 2.1, as exemplified in FIG. 6. For a candidate in the list, its LX motion vector with X equal to the parity of the merge candidate index value, is used as the uni-prediction motion vector for triangle partition mode. These motion vectors are marked with "x" in FIG. 6. In case a corresponding LX motion vector does not exist, the L(1-X) motion vector of the same candidate in the extended merge prediction candidate list is used as the uni-prediction motion vector for triangle partition mode.

2.2.2. Blending Along the Triangle Partition Edge

Figure 7:
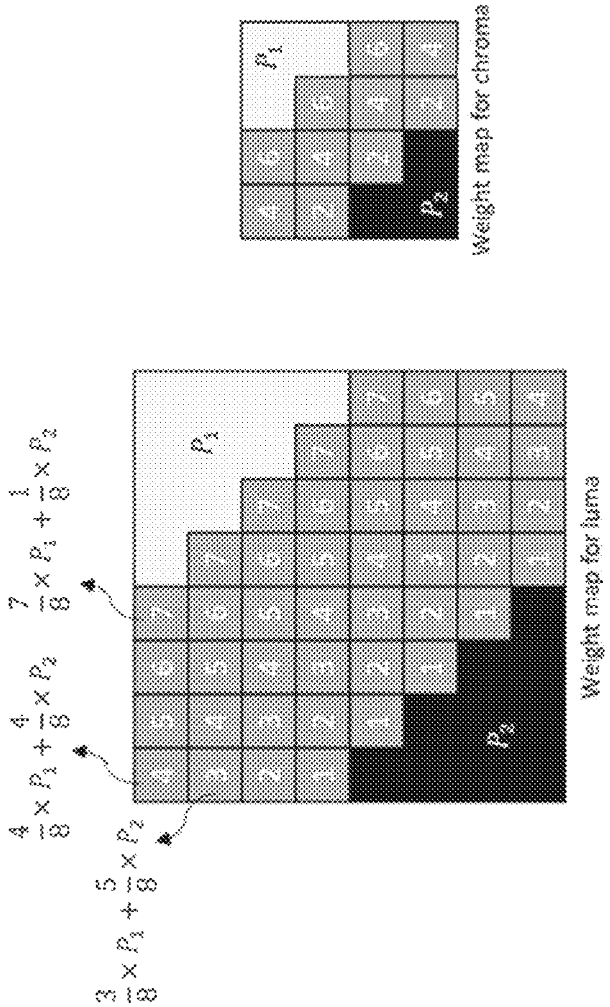
FIG. 7 shows examples of weights used in a blending process.

After predicting each triangle partition using its own motion, blending is applied to the two prediction signals to derive samples around the diagonal or anti-diagonal edge. The following weights are used in the blending process:

7/8, 6/8, 5/8, 4/8, 3/8, 2/8, 1/8} for luma and {6/8, 4/8, 2/8} for chroma, as shown in FIG. 7.

FIG. 7 shows examples of weights used in the blending process.

2.2.3. Motion Field Storage

The motion vectors of a CU coded in triangle partition mode are stored in 4×4 units. Depending on the position of each 4×4 unit, either uni-prediction or bi-prediction motion vectors are stored. Denote Mv1 and Mv2 as uni-prediction motion vectors for partition 1 and partition 2, respectively. If a 4×4 unit is located in the non-weighted area shown in the example of FIG. 7, either Mv1 or Mv2 is stored for that 4×4 unit. Otherwise, if the 4×4 unit is located in the weighted area, a bi-prediction motion vector is stored. The bi-prediction motion vector is derived from Mv1 and Mv2 according to the following process:

1) If Mv1 and Mv2 are from different reference picture lists (one from L0 and the other from L1), then Mv1 and Mv2 are simply combined to form the bi-prediction motion vector.
2) Otherwise, if Mv1 and Mv2 are from the same list, and without loss of generality, assume they are both from L0. In this case,
   2.a) If the reference picture of either Mv2 (or Mv1) appears in L1, then that Mv2 (or Mv1) is converted to a L1 motion vector using that reference picture in L1. Then the two motion vectors are combined to form the bi-prediction motion vector;

Otherwise, instead of bi-prediction motion, only uni-prediction motion Mv1 is stored.

2.3. Geometrical Partitioning (GEO) for Inter Prediction

Geometric merge mode (GEO) was proposed in the 15th Gothenburg JVET meeting as an extension of the existing triangle prediction mode (TPM). In the 16th Geneva JVET meeting, a simpler designed GEO mode has been selected as a core experiment (CE) anchor for further study. Nowadays GEO mode is being studied as a replacement of the existing TPM in VVC.

Figure 8:
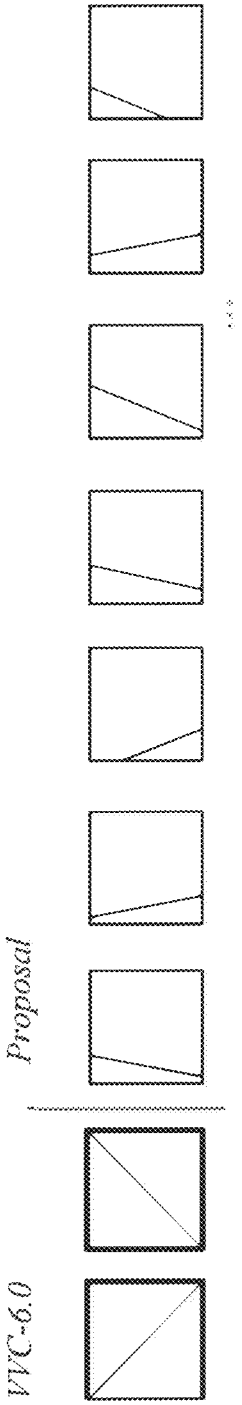
FIG. 8 illustrates an example proposal and triangle partition mode (TPM) design in VTM-6.0.

FIG. 8 illustrates TPM in VTM-6.0 and additional shapes proposed for non-rectangular inter blocks.

Figure 9:
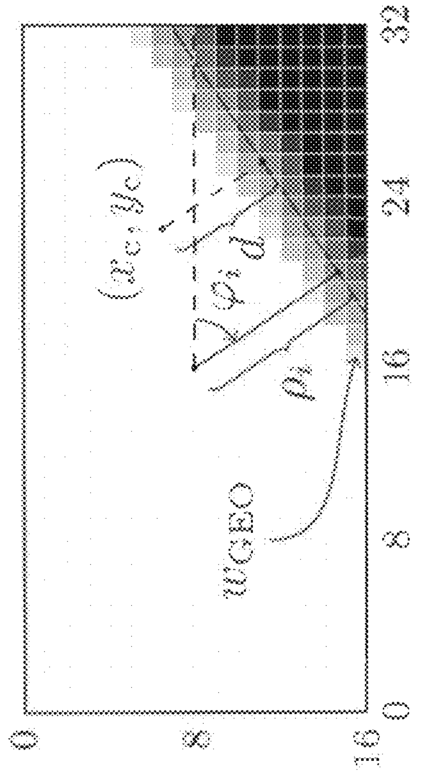
FIG. 9 shows an example of a geometric merge mode (GEO) split boundary description.

The split boundary of geometric merge mode is descripted by angle $\varphi_i$ and distance offset $\rho_i$ as shown in FIG. 9. Angle $\varphi_i$ represents a quantized angle between 0 and 360 degrees and distance offset $\rho_i$ represents a quantized offset of the largest distance $\rho_{max}$. In addition, the split directions overlapped with binary tree splits and TPM splits are excluded.

Figure 10B:
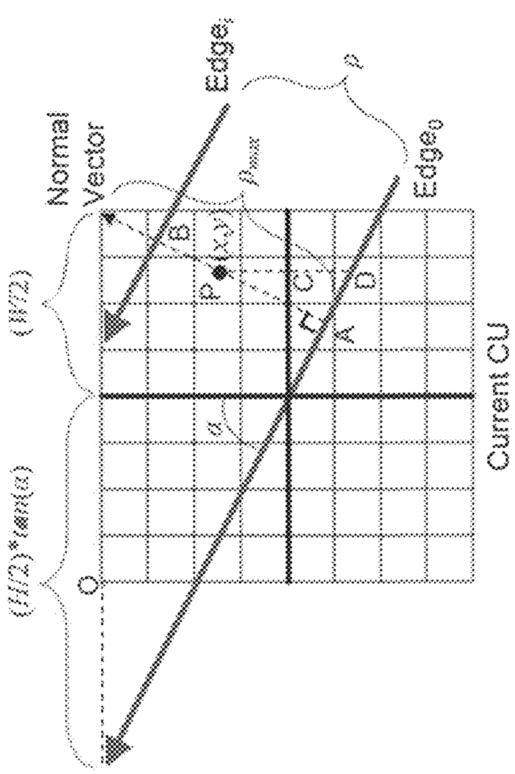
FIG. 10B shows geometric relations between a given sample position (x,y) and two edges, in accordance with various examples.
Figure 10A:
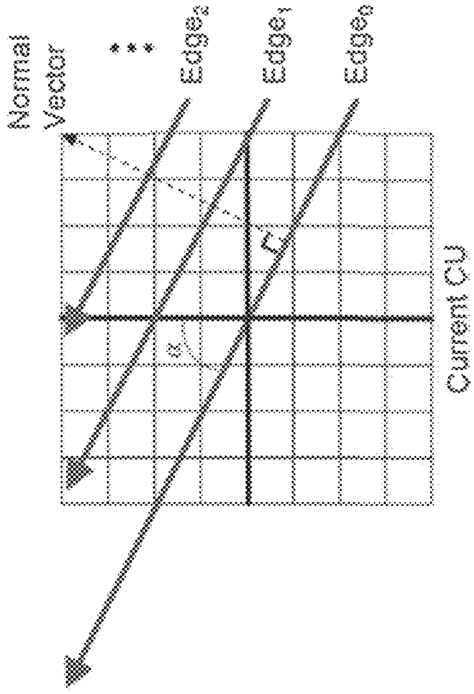
FIG. 10A shows edges supported in GEO, in accordance with various examples.

GEO is applied to block sizes not smaller than 8×8, and for each block size, there are 82 different partitioning manners, differentiated by 24 angles and 4 edges relative to the center of a CU. FIG. 10A shows that the 4 edges are distributed uniformly along the direction of normal vector within a CU, starting from Edge0 that passes through the CU center. Each partition mode (e.g., a pair of an angle index and an edge index) in GEO is assigned with a sample-adaptive weight table to blend samples on the two partitioned parts, where the weight value of a sampled ranges from 0 to 8 and is determined by the L2 distance from the center position of a sample to the edge. Generally, unit-gain constraint is followed when weight values are assigned, that is, when a small weight value is assigned to a GEO partition, a large complementary one is assigned to the other partition, summing up to 8.

The computation of the weight value of each sample is two-fold: (a) computing the displacement from a sample position to a given edge; and (b) mapping the computed displacement to a weight value through a pre-defined look-up table. The way to compute the displacement from a sample position (x, y) to a given edge Edgei is actually the same as computing the displacement from (x, y) to Edge0 and subtract this displacement by the distance ρ between Edge0 and Edgei. FIG. 10B illustrates the geometric relations among (x, y) and edges. Specifically, the displacement from (x, y) to Edgei can be formulated as follows:

$$\overline{PB} = \overline{PA} - \rho \tag{1}$$

$$= (\overline{PC} + \overline{CD}) * \sin(\alpha) - \rho \tag{2}$$

$$= \left(\left(\frac{H}{2} - y\right) + \left(x - \frac{W}{2}\right) * \cot(\alpha)\right) * \sin(\alpha) - \rho \tag{3}$$

$$= \left(x - \frac{W}{2}\right) * \cos(\alpha) - \left(y - \frac{H}{2}\right) * \sin(\alpha) - \rho \tag{4}$$

$$= x * \cos(\alpha) - y * \sin(\alpha) - \left(\rho + \frac{W}{2} * \cos(\alpha) - \frac{H}{2} * \sin(\alpha)\right) \tag{5}$$

$$= x * \cos(\alpha) + y * \cos\left(\alpha + \frac{\pi}{2}\right) - \left(\rho + \frac{W}{2} * \cos(\alpha) + \frac{H}{2} * \cos\left(\alpha + \frac{\pi}{2}\right)\right). \tag{6}$$

FIG. 10A shows Edges supported in GEO. FIG. 10B shows Geometric relations between a given sample position (x,y) and two edges.

The value of p is a function of the maximum length (denoted by ρmax) of the normal vector and edge index i, that is:

$$\rho = i * (\rho_{max} - 1)/N \tag{7}$$

$$= i * \left(\left(\frac{H}{2} * \tan(\alpha) + \frac{W}{2}\right) * \cos(\alpha) - 1\right)/N, \tag{8}$$

where N is the number of edges supported by GEO and the "1" is to prevent the last edge EdgeN−1 from falling too close to a CU corner for some angle indices. Substituting Eq. (8) from (6), we can compute the displacement from each sample (x,y) to a given Edgei. In short, we denote $\overline{PB}$ as wIdx (x,y). The computation of ρ is needed once per CU, and the computation of wIdx (x,y) is needed once per sample, in which multiplications are involved.

2.4. Merge with Motion Vector Difference (MMVD)

MMVD is also known as Ultimate Motion Vector Expression (UMVE).

UMVE is presented. UMVE is used for either skip or merge modes with a proposed motion vector expression method.

UMVE re-uses merge candidate as same as those included in the regular merge candidate list in VVC. Among the merge candidates, a base candidate can be selected, and is further expanded by the proposed motion vector expression method.

UMVE provides a new motion vector difference (MVD) representation method, in which a starting point, a motion magnitude and a motion direction are used to represent a MVD.

Figure 11:
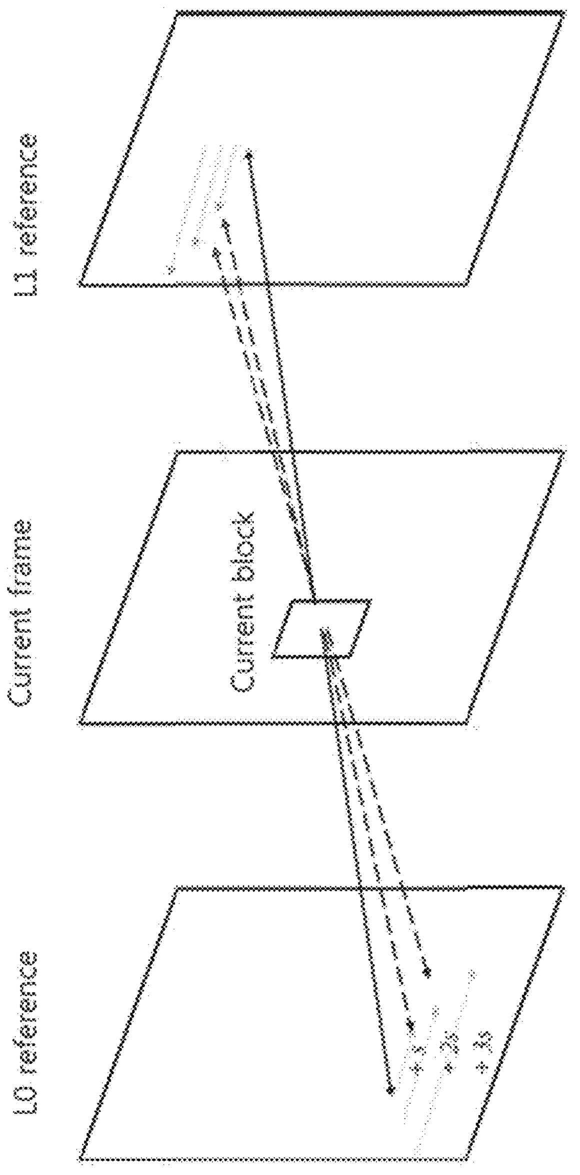
FIG. 11 shows an example of an ultimate motion vector expression (UMVE) Search Process.

FIG. 11 shows an example of a UMVE Search Process.

Figure 12:
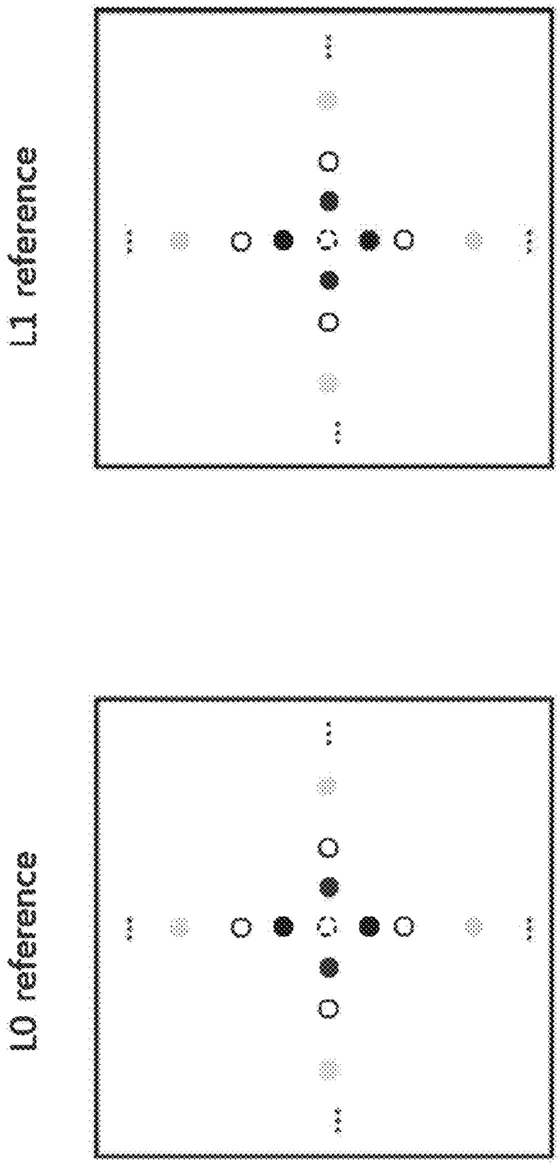
FIG. 12 shows an example of a UMVE Search Point.

FIG. 12 shows an example of a UMVE Search Point.

This proposed technique uses a merge candidate list as it is. But only candidates which are default merge type (MRG_TYPE_DEFAULT_N) are considered for UMVE's expansion.

Base candidate index defines the starting point. Base candidate index indicates the best candidate among candidates in the list as follows.

TABLE 2.4.1

| Base candidate IDX | | | | |
|---|---|---|---|---|
| Base candidate IDX | 0 | 1 | 2 | 3 |
| $N^{th}$ MVP | $1^{st}$ MVP | $2^{nd}$ MVP | $3^{rd}$ MVP | $4^{th}$ MVP |

If the number of base candidate is equal to 1, Base candidate IDX is not signaled.

Distance index is motion magnitude information. Distance index indicates the pre-defined distance from the starting point information. Pre-defined distance is as follows:

TABLE 2.4.2a

| Distance IDX | | | | | | | | |
|---|---|---|---|---|---|---|---|---|
| Distance IDX | 0 | 1 | 2 | 3 | 4 | 5 | 6 | 7 |
| Sample distance | ¼-pel | ½-pel | 1-pel | 2-pel | 4-pel | 8-pel | 16-pel | 32-pel |

The distance IDX is binarized in bins with the truncated unary code in the entropy coding procedure as:

TABLE 2.4.2b

| Distance IDX Binarization | | | | | | | | |
|---|---|---|---|---|---|---|---|---|
| Distance IDX | 0 | 1 | 2 | 3 | 4 | 5 | 6 | 7 |
| Bins | 0 | 10 | 110 | 1110 | 11110 | 111110 | 1111110 | 1111111 |

In arithmetic coding, the first bin is coded with a probability context, and the following bins are coded with the equal-probability model, which is otherwise known as bypass coding.

Direction index represents the direction of the MVD relative to the starting point. The direction index can represent of the four directions as shown below.

TABLE 2.4.3

| Direction IDX | | | | |
|---|---|---|---|---|
| Direction IDX | 00 | 01 | 10 | 11 |
| x-axis | + | − | N/A | N/A |
| y-axis | N/A | N/A | + | − |

UMVE flag is signaled right after sending a skip flag or merge flag. If skip or merge flag is true, UMVE flag is parsed. If UMVE flag is equal to 1, UMVE syntaxes are parsed. But, if not 1, AFFINE flag is parsed. If AFFINE flag is equal to 1, that is AFFINE mode, But, if not 1, skip/merge index is parsed for VTM's skip/merge mode.

Additional line buffer due to UMVE candidates is not needed. Because a skip/merge candidate of software is directly used as a base candidate. Using input UMVE index, the supplement of MV is decided right before motion compensation. There is no need to hold long line buffer for this.

In VVC, either the first or the second merge candidate in the merge candidate list could be selected as the base candidate.

FIG. 11 and FIG. 12 show the MVD searching process and searching points for UMVE.

3. Technical Problems Solved by Technical Solutions Disclosed Herein

In the current design of TPM/GEO, the MV for a partition is directly inherited from a merge candidate without any refinement, which may not be accurate.

4. Solution Examples

The detailed items below should be considered as examples to explain general concepts. These items should not be interpreted in a narrow way. Furthermore, these items can be combined in any manner.

The term 'GEO' may represent a coding method that splits one block into two or more sub-regions which generally could not be achieved by partitioning types, such as quad tree (QT), binary tree (BT), and triple tree (TT). The term 'GEO' may also be known as 'GPM'. The term 'GPM' may indicate the triangle prediction mode (TPM), and/or geometric merge mode (GEO), and/or wedge prediction mode.

The term 'block' may represent a coding block of CU and/or Picture Unit (PU) and/or Transform Unit (TU).

A coding method, named geometric prediction mode with motion vector difference (GMVD), is proposed. In GMVD, more than one motion vector differences (MVDs) may be signaled or derived for a block, wherein at least one MVD of the multiple MVDs is added to a MV derived from a merge candidate, to obtain a refined MV, which is used in the motion compensation for at least a sample within the block and/or stored to be used for succeeding process. It should be noted that for the bullets below, they may be applied to GMVD or conventional MMVD methods.

The vector operations in this document are done in a common way in mathematics. For example, (a, b)*c is equal to (a*c, b*c).

1. A GMVD-coded block may be partitioned into more than one partitions.
   a. In one example, at least one partition is non-rectangular.
   b. In one example, the block is partitioned into two partitions by TPM and the merge candidate may be a TPM merge candidate.
   c. In one example, the block is partitioned into two partitions by GEO and the merge candidate may be a GEO merge candidate.
2. When a GMVD-coded block is partitioned into N partitions, at most N MVDs are signaled or derived for the partitions, wherein N>=2. In one example, N is equal to 2.
   a. In one example, N MVDs are signaled or derived and each MVD corresponds to a specific partition.
      i. Alternatively, furthermore, the MVD corresponding a partition is added to the MV of the partition to obtain a refined MV for the partition, to be used in the motion compensation for the partition.
   b. In one example, K (K<N) MVDs are signaled or derived and one MVD may correspond to more than one partition.
   c. In one example, how many MVDs to be signaled may be dependent on decoded information, such as, block dimension, low delay check flag, prediction direction or reference picture lists associated with the N partitions.
   d. In one example, the number of MVDs are signaled.
   e. In one example, multiple MVDs may be used by a partition.
      i. For example, multiple MVDs may be added to the MV of the partition to obtain a refined MV for the partition.
3. It is proposed that a first message (e.g., a flag) is signaled to indicate whether at least one of the pluralities of MVDs is not equal to zero.
   a. In one example, the first message is context-coded or bypass-coded in the arithmetic coding.
      i. Alternatively, furthermore, the first message is coded with at least one context the same as the syntax element to indicate whether MMVD is applied.
   b. Alternatively, furthermore, information related to the pluralities of MVDs is signaled only if the first message indicates that at least one of the pluralities of MVDs is not equal to zero.
4. It is proposed that a non-zero message for at least one of the pluralities of MVDs is signaled to indicate whether the MVD is equal to zero.
   a. In one example, at least one binarized bin of the message is context-coded in the arithmetic coding.
      i. Alternatively, at least one binarized bin of the message is bypass-coded in the arithmetic coding.
   b. In one example, the message is coded with at least one context the same as the syntax element to indicate whether MMVD is applied.
   c. Alternatively, furthermore, information (e.g., the direction and/or the absolute values) associated to an MVD is signaled only if the non-zero message indicates that MVD is not equal to zero.
   d. Alternatively, furthermore, the non-zero message for the last MVD is not signaled and the last MVD is inferred to be non-zero if the first message indicates that at least one of the pluralities of MVDs is not equal to zero and all the MVDs before the last one is zero.
5. It is proposed that at least one of the pluralities of MVDs are signaled with a syntax element indicating the horizontal component of the MVD.
6. It is proposed that at least one of the pluralities of MVDs are signaled with a syntax element indicating the vertical component of the MVD.
7. It is proposed that at least one of the pluralities of MVDs are signaled with a syntax element indicating the absolute value(s) of the horizontal component and/or the vertical component of the MVD.
8. It is proposed that a second MVD may be derived depending on a first MVD which is signaled or derived before signaling or deriving the second MVD.
9. Similar to the MMVD design, the MVDs used in GMVD may be represented by two variables, direction and magnitude (or distance) denoted by D. And the following may apply in addition:
   a. At least one of the pluralities of MVDs are signaled with a syntax element indicating direction (e.g., horizontal or vertical) of the MVD.
      i. In one example, the directions may include but not limited:
         1) The MVD is in a form of (1, 0)*D, wherein D is no smaller than 0.
         2) The MVD is in a form of (−1, 0)*D, wherein D is no smaller than 0.
         3) The MVD is in a form of (0, 1)*D, wherein D is no smaller than 0.
         4) The MVD is in a form of (0, −1)*D, wherein D is no smaller than 0.
         5) The MVD is in a form of (1, 1)*D, wherein D is no smaller than 0.
         6) The MVD is in a form of (−1, 1)*D, wherein D is no smaller than 0.
         7) The MVD is in a form of (1, −1)*D, wherein D is no smaller than 0.
         8) The MVD is in a form of (−1, −1)*D, wherein D is no smaller than 0.
      ii. In one example, only four directions mentioned in 9.a.i.1) to 9.a.i.4) are utilized.
      iii. In one example, the direction may be binarized with a fixed length coding, or a unary coding, or an exponential-Golomb coding.
   b. In one example, D is larger than 0.
   c. for GMVD-coded blocks, indication of an MVD magnitude (or distance) may be denoted by D which may be signaled or derived
      i. In one example, D is restricted to be in a candidate set.
         1) In one example, the candidate set may comprise a zero.
         2) In one example, the candidate set may comprise ¼-sample, ½-sample, or other fractional samples.
         3) In one example, the candidate set may comprise 1-sample, 2-sample, 4-sample, 8-sample, 16-sample, 32-sample, 64-sample, 128-sample or other 2N samples.
         4) In one example, the candidate set may comprise 3-sample, 6-sample, 12-sample, 24-sample, or other integer samples.
         5) In one example, the candidate set may be {¼-sample, ½-sample, 1-sample, 2-sample, 4-sample, 8-sample, 16-sample, 32-sample}.

6) In one example, the candidate set may be {¼-sample, ½-sample, 1-sample, 2-sample, 3-sample, 4-sample, 6-sample, 8-sample, 16-sample}.

7) In one example, the candidate set may be set equal to that used for MMVD-coded blocks in the same video processing unit (e.g., slice/tile/subpicture/picture/sequence).

a. Alternatively, the candidate set may include more candidates in addition to those used for MMVD-coded blocks in the same video processing unit.

b. Alternatively, at least one candidate in the candidate set may be different from those used for MMVD-coded blocks in the same video processing unit.

c. Alternatively, at least one candidate in the candidate set may be equal to one of those used for MMVD-coded blocks in the same video processing unit.

8) In one example, instead of signaling the D directly, index of the selected MVD magnitude in the candidate set is signaled.

ii. In one example, multiple candidate sets of MVDs may be pre-defined, and one of them may be selected for encoding/decoding current GMVD-coded block.

1) In one example, the selection is dependent on a message signaled in slice/picture/sequence level, such as slice header/picture header/Picture Parameter Set (PPS)/Sequence Parameter Set (SPS).

2) In one example, the selection is dependent on the same message used for MMVD coded blocks, such as sps_fpel_mmvd_enabled_flag.

iii. In one example, D is binarized as a fixed length coding, or a unary coding, or an exponential-Golomb coding.

iv. In one example, at least one binarized bin of D is context-coded in the arithmetic coding.

v. Alternatively, at least one binarized bin of the message is bypass-coded in the arithmetic coding.

vi. In one example, the first bin of D is context-coded in the arithmetic coding.

1) Alternatively, furthermore, other bins of D are bypass coded.

d. For example, the derived MVD from D, may be further modified before being used to derive the final MVD for a partition.

i. In one example, D may be modified as D=D<<S, S is an integer such as 2.

ii. Whether to apply the modification may be deduced implicitly.

1) For example, the modification may be applied if the width and/or height of the current picture is larger than a threshold.

iii. Whether to apply the modification may depend on a signaled message which may be at sequence level (e.g., in SPS and/or the sequence header), at picture level (e.g., in PPS and/or the picture header), at slice level (e.g., in slice header), at sub-picture level, at tile level, at CTU-row level, at CTU-level.

1) For example, the same message, sps_fpel_mmvd_enabled_flag and/or pic_fpel_mmvd_enabled_flag in VVC may be used to control both MMVD and GMVD.

2) Alternatively, separate messages may be signaled to control MMVD and GMVD, respectively.

10. In above examples, the block may be partitioned into two partitions by TPM or GEO, and two MVDs may be signaled or derived for the two partitions.

a. Alternatively, furthermore, the MV for a partition is calculated as a sum of the MV derived by TPM or GEO for the partition and the MVD for the partition.

b. Alternatively, furthermore, the weighted sum process of the two motion compensations with the two MVs for the two partitions are performed in the same way as TPM or GEO.

c. Alternatively, furthermore, the MV storage process of the two MVs for the two partitions are performed in the same way as TPM or GEO.

11. In above examples, whether to signal or derive the proposed multiple MVDs may be conditioned.

a. In one example, whether to signal or derive the proposed multiple MVDs may depend on whether GEO is enabled for the current block.

b. In one example, proposed multiple MVDs are inferred to be zero if they are not signaled or derived.

c. In one example, whether to signal or derive the proposed GMVD may be signaled at sequence level (e.g., in SPS and/or the sequence header), at picture level (e.g., in PPS and/or the picture header), at slice level (e.g., in slice header), at sub-picture level, at tile level, at CTU-row level, at CTU-level.

i. Alternatively, furthermore, whether to enable GMVD may be conditionally signaled, such as under the condition that TPM/GEO is enabled.

d. In one example, whether to signal or derive the proposed multiple MVDs may depend on the block width (W) and/or block height (H). For example, the proposed multiple MVDs may not be signaled or derived if at least one or any combinations of the following conditions are satisfied.

$$W > T1. \text{ E.g. } T1 = 64. \quad \text{i.}$$

$$H >= T2. \text{ E.g. } T2 = 64. \quad \text{ii.}$$

$$W >= T3 * H. \text{ E.g. } T3 = 4. \quad \text{iii.}$$

$$H >= T4 * H. \text{ E.g. } T4 = 8. \quad \text{iv.}$$

$$W <= T5. \text{ E.g. } T5 = 8. \quad \text{v.}$$

$$H <= T6. \text{ E.g. } T6 = 8. \quad \text{vi.}$$

$$W * H >= T7, \text{ E.g. } T7 = 2048 \quad \text{vii.}$$

$$W * H <= T8, \text{ E.g. } T8 = 64 \quad \text{viii.}$$

$$W == T9 \text{ or } H == T10. \text{ (e.g., } T9 = T10 = 4) \quad \text{ix.}$$

$$W/H > T11 \text{ or } \max(W, H)/\min(W, H) >= T11 \quad \text{x.}$$

$$W/H < T11 \text{ or } \max(W, H)/\min(W, H) < T11 \quad \text{xi.}$$

e. Whether to signal or derive the proposed multiple MVDs may depend on the merge candidate indices.

i. In one example, the merge candidate index is larger than value.

12. For GMVD-coded blocks, MVDs may be signaled before the merge candidate indices.

a. Alternatively, furthermore, the merge candidate index may be signaled depending on whether the proposed multiple MVDs are signaled or derived.

b. Alternatively, furthermore, how to signal the merge candidate indices (e.g., binarization process) for GMVD-coded blocks may depend on the usage of GMVD.
   i. In one example, the maximum merge candidate index that can be signaled may be reduced if the proposed multiple MVDs are signaled or derived.

5. Embodiments

5.1. An Example of Draft Changes

Merge data syntax

| | Descriptor |
|---|---|
| merge_data( x0, y0, cbWidth, cbHeight, chType ) { | |
| if( CuPredMode[ chType ][ x0 ][ y0 ] = = MODE_IBC ) { | |
| if( MaxNumIbcMergeCand > 1 ) | |
| merge_idx[ x0 ][ y0 ] | ae(v) |
| } else { | |
| if( MaxNumSubblockMergeCand > 0 && cbWidth >= 8 && cbHeight >= 8 ) | |
| merge_subblock_flag[ x0 ][ y0 ] | ae(v) |
| if( merge_subblock_flag[ x0 ][ y0 ] = = 1 ) { | |
| if( MaxNumSubblockMergeCand > 1 ) | |
| merge_subblock_idx[ x0 ][ y0 ] | ae(v) |
| } else { | |
| if( ( cbWidth * cbHeight ) >= 64 && ( (sps_ciip_enabled_flag && cu_skip_flag[ x0 ][ y0 ] = = 0 && cbWidth < 128 && cbHeight < 128 ) \| \| ( sps_triangle_enabled_flag && MaxNumTriangleMergeCand > 1 && slice_type = = B ) ) ) | |
| regular_merge_flag[ x0 ][ y0 ] | ae(v) |
| if( regular_merge_flag[ x0 ][ y0 ] = = 1 ) { | |
| if( sps_mmvd_enabled_flag ) | |
| mmvd_merge_flag[ x0 ][ y0 ] | ae(v) |
| if( mmvd_merge_flag[ x0 ][ y0 ] = = 1 ) { | |
| if( MaxNumMergeCand > 1 ) | |
| mmvd_cand_flag[ x0 ][ y0 ] | ae(v) |
| mmvd_distance_idx[ x0 ][ y0 ] | ae(v) |
| mmvd_direction_idx[ x0 ][ y0 ] | ae(v) |
| } else if( MaxNumMergeCand > 1 ) | |
| merge_idx[ x0 ][ y0 ] | ae(v) |
| } else { | |
| if( sps_ciip_enabled_flag && sps_triangle_enabled_flag && MaxNumTriangleMergeCand > 1 && slice_type = = B && cu_skip_flag[ x0 ][ y0 ] = = 0 && ( cbWidth * cbHeight ) >= 64 && cbWidth < 128 && cbHeight < 128 ) | |
| ciip_flag[ x0 ][ y0 ] | ae(v) |
| if( ciip_flag[ x0 ][ y0 ] && MaxNumMergeCand > 1 ) | |
| merge_idx[ x0 ][ y0 ] | ae(v) |
| if( !ciip_flag[ x0 ][ y0 ] && MaxNumTriangleMergeCand > 1 ) { | |
| merge_triangle_split_dir[ x0 ][ y0 ] | ae(v) |
| merge_triangle_idx0[ x0 ][ y0 ] | ae(v) |
| if( MaxNumTriangleMergeCand > 2 ) | |
| merge_triangle_idx1[ x0 ][ y0 ] | ae(v) |
| tmvd_flag[ x0 ][ y0 ] | ae(v) |
| if(tmvd_flag[ x0 ][ y0 ]){ | |
| for( partIdx = 0; partIdx < 2; partIdx++ ) { | |
| if(partIdx == 0 \| \| tmvd_part_flag[ x0 ][ y0 ][ 0 ]) | |
| tmvd_part_flag[ x0 ][ y0 ][ partIdx] | |
| if(tmvd_part_flag[ x0 ][ y0 ][ partIdx]){ | |

-continued

Merge data syntax

| | Descriptor |
|---|---|
| tmvd_distance_idx[ x0 ][ y0 ][ partIdx] | ae(v) |
| tmvd_direction_idx[ x0 ][ y0 ][ partIdx] | ae(v) |
| } | |
| } | |
| } | |
| } | |
| } | |
| } | |
| } | |
| } | |
| Merge data semantics | |
| . . . | |

tmvd_flag[x0][y0] specifies whether the triangular prediction with motion vector difference is applied for the current coding unit. The array indices x0, y0 specify the location (x0, y0) of the top-left luma sample of the considered coding block relative to the top-left luma sample of the picture. When tmvd_flag[x0][y0] is not present, it is inferred to be equal to 0.

tmvd_part_flag[x0][y0][partIdx] specifies whether the triangular prediction with motion vector difference is applied for the partition with index equal to partIdx in the current coding unit. The array indices x0, y0 specify the location (x0, y0) of the top-left luma sample of the considered coding block relative to the top-left luma sample of the picture. When tmvd_part_flag[x0][y0][partIdx] is not present, it is inferred to be equal to 1 if tmvd_flag[x0][y0] is equal to 1 and partIdx is equal to 1. Otherwise, it is inferred to be equal to 0.

tmvd_distance_idx[x0][y0][partIdx] specifies the index used to derive TmvdDistance[x0][y0][partIdx]. The array indices x0, y0 specify the location (x0, y0) of the top-left luma sample of the considered coding block relative to the top-left luma sample of the picture.

TmvdDistanceArray[ ] is set to be equal to {4, 8, 16, 32, 48, 64, 96, 128, 256} and TmvdDistance[x0][y0][partIdx] is set to be to equal TmvdDistanceArray[tmvd_distance_idx[x0][y0][partIdx]].

mmvd_direction_idx[x0][y0] specifies index used to derive TmvdBaseMv[x0][y0][partIdx][compIdx] with compIdx=0 . . . 1. The array indices x0, y0 specify the location (x0, y0) of the top-left luma sample of the considered coding block relative to the top-left luma sample of the picture.

TmvdBaseArray[ ][ ] is set to be equal to {{1, 0}, {−1, 0}, {0, 1}, {0, −1}, {1, 1}, {1, −1}, {−1, 1}, {−1, −1}.

TmvdBase[x0][y0][partIdx][compIdx] is set to be equal to TmvdBaseArray[mmvd_direction_idx[x0][y0]][compIdx] for compIdx=0 . . . 1.

When tmvd_part_flag[x0][y0][partIdx] is equal to zero, TmvdOffset[x0][y0][partIdx][compIdx] is set to be equal to zero for compIdx=0 . . . 1. Otherwise, TmvdOffset[x0][y0][partIdx][compIdx] is set to be equal to TmvdBaseMv[x0][y0][partIdx][compIdx]*TmvdDistance[x0][y0][partIdx]*(pic_fpel_mmvd_enabled_flag==1?4:1) for compIdx=0 . . . 1.

Derivation Process for Luma Motion Vectors for Merge Triangle Mode

This process is only invoked when MergeTriangleFlag[xCb][yCb] is equal to 1, where (xCb, yCb) specify the top-left sample of the current luma coding block relative to the top-left luma sample of the current picture.

Inputs to this process are:

a luma location (xCb, yCb) of the top-left sample of the current luma coding block relative to the top-left luma sample of the current picture, a variable cbWidth specifying the width of the current coding block in luma samples, a variable cbHeight specifying the height of the current coding block in luma samples.

Outputs of this process are:

the luma motion vectors in 1/16 fractional-sample accuracy mvA and mvB, the reference indices refIdxA and refIdxB, the prediction list flags predListFlagA and predListFlagB.

The motion vectors mvA and mvB, the reference indices refIdxA and refIdxB and the prediction list flags predListFlagA and predListFlagB are derived by the following ordered steps:

1. The derivation process for luma motion vectors for merge mode as specified in clause 8.5.2.2 is invoked with the luma location (xCb, yCb), the variables cbWidth and cbHeight inputs, and the output being the luma motion vectors mvL0[0][0], mvL1[0][0], the reference indices refIdxL0, refIdxL1, the prediction list utilization flags predFlagL0[0][0] and predFlagL1[0][0], the bi-prediction weight index bcwIdx and the merging candidate list mergeCandList.
2. The variables m and n, being the merge index for triangle partition 0 and 1 resepctively, are derived using merge_triangle_idx0[xCb][yCb] and merge_triangle_idx1[xCb][yCb] as follows:

$$m = \text{merge\_triangle\_idx0}[xCb][yCb] \quad (657)$$

$$n = \text{merge\_triangle\_idx1}[xCb][yCb] + (\text{merge\_triangle\_idx1}[xCb][yCb] >= m)\,?\,1:0 \quad (658)$$

3. Let refIdxL0M and refIdxL1M, predFlagL0M and predFlagL1M, and mvL0M and mvL1M be the reference indices, the prediction list utilization flags and the motion vectors of the merging candidate M at position m in the merging candidate list mergeCandList (M=mergeCandList[m]).
4. The variable X is set equal to (m & 0x01).
5. When predFlagLXM is equal to 0, X is set equal to (1−X).
6. The following applies:

$$mvA[0] = mvLXM[0] + Tmvd\text{Offset}[x0][y0][0][0] \quad (659)$$

$$mvA[1] = mvLXM[1] + Tmvd\text{Offset}[x0][y0][0][1] \quad (660)$$

$$refIdxA = refIdxLXM \quad (661)$$

$$predListFlagA = X \quad (662)$$

7. Let refIdxL0N and refIdxL1N, predFlagL0N and predFlagL1N, and mvL0N and mvL1N be the reference indices, the prediction list utilization flags and the motion vectors of the merging candidate N at position m in the merging candidate list mergeCandList (N=mergeCandList[n]).
8. The variable X is set equal to (n & 0x01).
9. When predFlagLXN is equal to 0, X is set equal to (1-X).
10. The following applies:

$$mvB[0] = mvLXN[0] + TmvdOffset[x0][y0][1][0] \quad (663)$$

$$mvB[1] = mvLXN[1] + TmvdOffset[x0][y0][1][1] \quad (664)$$

$$refIdxB = refIdxLXN \quad (665)$$

$$predListFlagB = X \quad (666)$$

TABLE 123

Syntax elements and associated binarizations

| Syntax structure | Syntax element | Binarization Process | Binarization Input parameters |
|---|---|---|---|
| slice_data( ) | end_of_slice_one_bit | FL | cMax = 1 |
| | end_of_tile_one_bit | FL | cMax = 1 |
| | end_of_subset_one_bit | FL | cMax = 1 |
| . . . | | | |
| merge_data( ) | regular_merge_flag[ ][ ] | FL | cMax = 1 |
| | mmvd_merge_flag[ ][ ] | FL | cMax = 1 |
| | mmvd_cand_flag[ ][ ] | FL | cMax = 1 |
| | mmvd_distance_idx[ ][ ] | TR | cMax = 7, cRiceParam = 0 |
| | mmvd_direction_idx[ ][ ] | FL | cMax = 3 |
| | ciip_flag[ ][ ] | FL | cMax = 1 |
| | merge_subblock_flag[ ][ ] | FL | cMax = 1 |
| | merge_subblock_idx[ ][ ] | TR | cMax = MaxNumSubblockMergeCand − 1, cRiceParam = 0 |
| | merge_triangle_split_dir[][] | FL | cMax = 1 |
| | merge_triangle_idx0[ ][ ] | TR | cMax = MaxNumTriangleMergeCand − 1, cRiceParam = 0 |
| | merge_triangle_idx1[ ][ ] | TR | cMax = MaxNumTriangleMergeCand − 2, cRiceParam = 0 |
| | tmvd_flag[ ][ ] | FL | cMax = 1 |
| | tmvd_part_flag[ ][ ][ ] | FL | cMax = 1 |
| | tmvd_distance_idx[ ][ ][ ] | FL | cMax = 7 |
| | tmvd_direction_idx[ ][ ][ ] | TR | cMax = 8, cRiceParam = 0 |
| | merge_idx[ ][ ] | TR | cMax = |

TABLE 123-continued

| Syntax elements and associated binarizations | | | |
|---|---|---|---|
| Syntax | | Binarization | |
| structure | Syntax element | Process | Input parameters |
| | | | ( CuPredMode[ 0 ][ x0 ][ y0 ] != MODE_IBC ? MaxNumMergeCand : MaxNumIbcMergeCand ) − 1, cRiceParam = 0 |
| . . . | | | |

TABLE 128

Assignment of ctxInc to syntax elements with context coded bins

| | binIdx | | | | | |
|---|---|---|---|---|---|---|
| Syntax element | 0 | 1 | 2 | 3 | 4 | >=5 |
| end_of_slice_one_bit | terminate | na | na | na | na | na |
| . . . | | | | | | |
| general_merge_flag[ ][ ] | 0 | na | na | na | na | na |
| regular_merge_flag[ ][ ] | cu_skip_flag[ ][ ] ? 0 : 1 | na | na | na | na | na |
| mmvd_merge_flag[ ][ ] | 0 | na | na | na | na | na |
| mmvd_cand_flag[ ][ ] | 0 | na | na | na | na | na |
| mmvd_distance_idx[ ][ ] | 0 | bypass | bypass | bypass | bypass | bypass |
| mmvd_direction_idx[ ][ ] | bypass | bypass | na | na | na | na |
| merge_subblock_flag[ ][ ] | 0, 1, 2 (clause 9.3.4.2.2) | na | na | na | na | na |
| merge_subblock_idx[ ][ ] | 0 | bypass | bypass | bypass | bypass | na |
| ciip_flag[ ][ ] | 0 | na | na | na | na | na |
| merge_idx[ ][ ] | 0 | bypass | bypass | bypass | bypass | na |
| merge_triangle_split_dir[ ][ ] | bypass | na | na | na | na | na |
| merge_triangle_idx0[ ][ ] | 0 | bypass | bypass | bypass | bypass | na |
| merge_triangle_idx1[ ][ ] | 0 | bypass | bypass | bypass | na | na |
| tmvd_flag | 0 | na | na | na | na | na |
| tmvd_part_flag[ ][ ][ ] | 0 | na | na | na | na | na |
| tmvd_distance_idx[ ][ ][ ] | 0 | bypass | bypass | bypass | bypass | bypass |
| tmvd_direction_idx[ ][ ][ ] | bypass | bypass | bypass | na | na | na |
| . . . | | | | | | |

Figure 13:
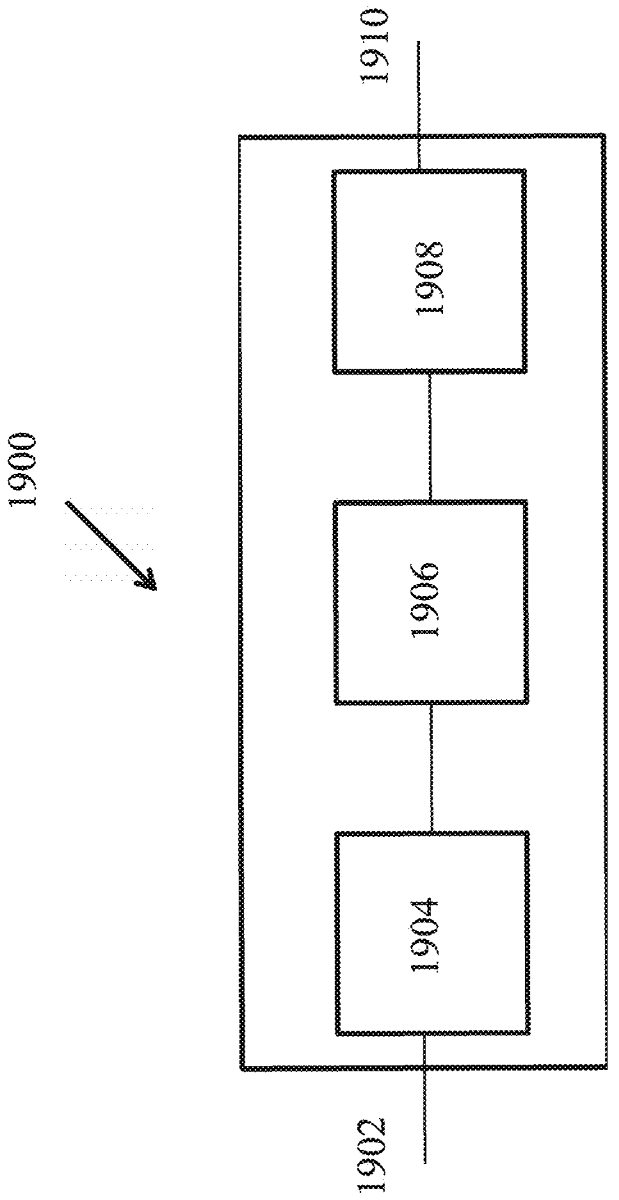
FIG. 13 is a block diagram showing an example video processing system.

FIG. 13 is a block diagram showing an example video processing system 1900 in which various techniques disclosed herein may be implemented. Various implementations may include some or all of the components of the system 1900. The system 1900 may include input 1902 for receiving video content. The video content may be received in a raw or uncompressed format, for example, 8 or 10 bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as wireless fidelity (WI-FI) or cellular interfaces.

The system 1900 may include a coding component 1904 that may implement the various coding or encoding methods described in the present document. The coding component 1904 may reduce the average bitrate of video from the input 1902 to the output of the coding component 1904 to produce a coded representation of the video. The coding techniques are therefore sometimes called video compression or video transcoding techniques. The output of the coding component 1904 may be either stored, or transmitted via a communication connected, as represented by the component 1906. The stored or communicated bitstream (or coded) representation of the video received at the input 1902 may be used by the component 1908 for generating pixel values or displayable video that is sent to a display interface 1910. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and the like. Examples of storage interfaces include serial advanced technology attachment (SATA), peripheral component interconnect (PCI), integrated drive electronics (IDE) interface, and the like. The techniques described in the present document may be embodied in various electronic devices such as mobile phones, laptops, smartphones or other devices that are capable of performing digital data processing and/or video display.

Figure 14:
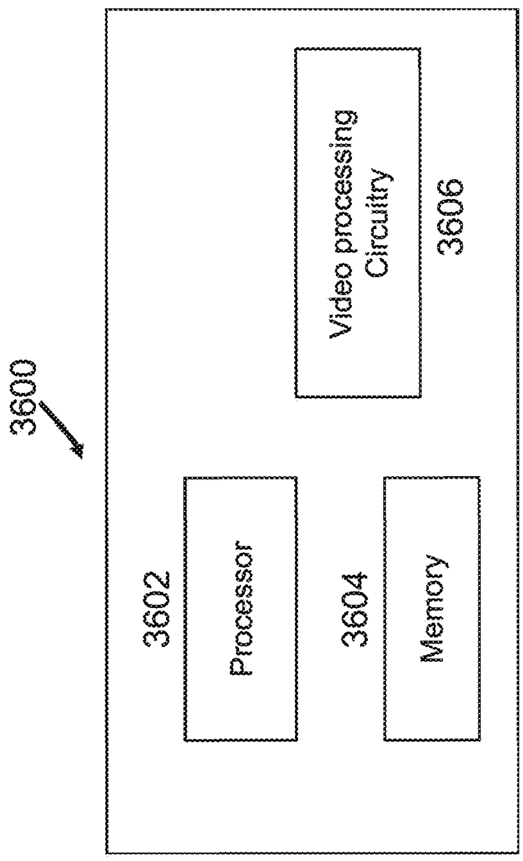
FIG. 14 is a block diagram of an example hardware platform used for video processing.

FIG. 14 is a block diagram of a video processing apparatus 3600. The apparatus 3600 may be used to implement one or more of the methods described herein. The apparatus 3600 may be embodied in a smartphone, tablet, computer, Internet of Things (IoT) receiver, and so on. The apparatus 3600 may include one or more processors 3602, one or more memories 3604 and video processing circuitry 3606. The processor(s) 3602 may be configured to implement one or more methods described in the present document. The memory (memories) 3604 may be used for storing data and code used for implementing the methods and techniques described herein. The video processing circuitry 3606 may be used to implement, in hardware circuitry, some techniques described in the present document.

Figure 16:
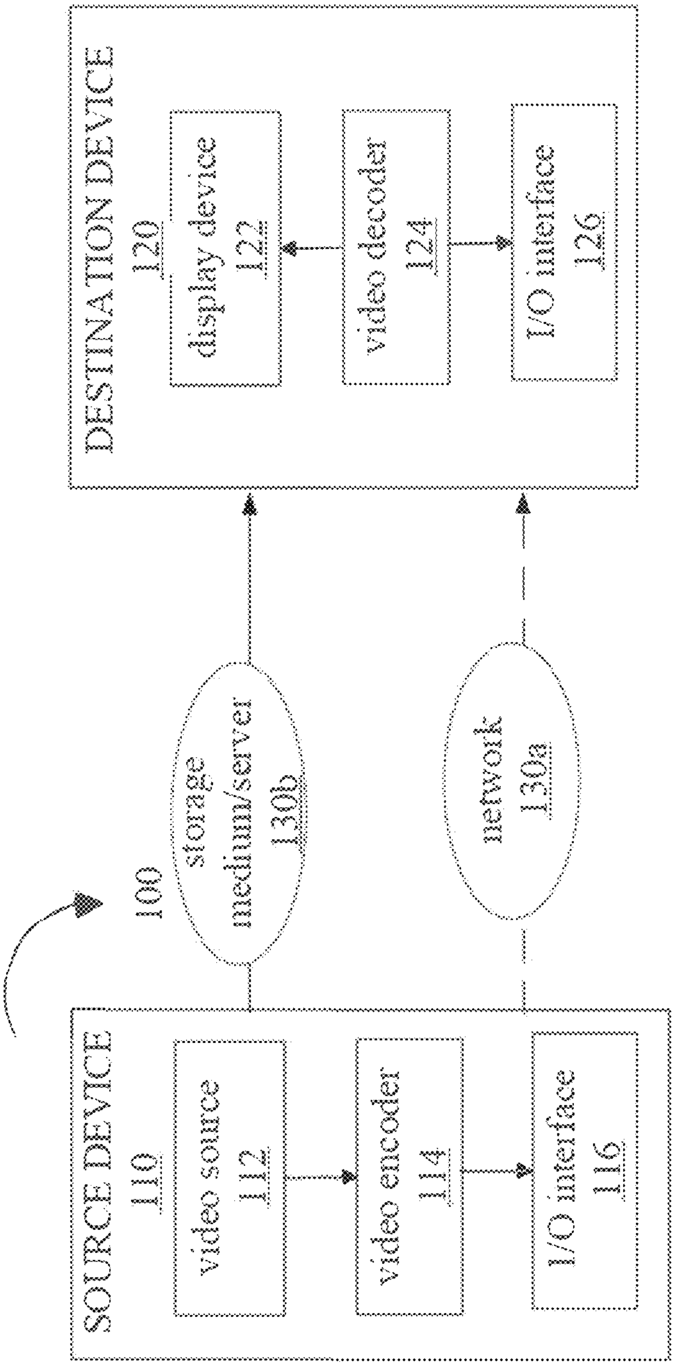
FIG. 16 is a block diagram that illustrates a video coding system, in accordance with various examples.

FIG. 16 is a block diagram that illustrates an example video coding system 100 that may utilize the techniques of this disclosure.

As shown in FIG. 16, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax 116 may include a modulator/demodulator (modem) and/or a transmitter. The encoded video data may be transmitted directly to destination device 120 via I/O interface 116 through network 130*a*. The encoded video data may also be stored onto a storage medium/server 130*b* for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130*b*. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVM) standard and other current and/or further standards.

Figure 17:
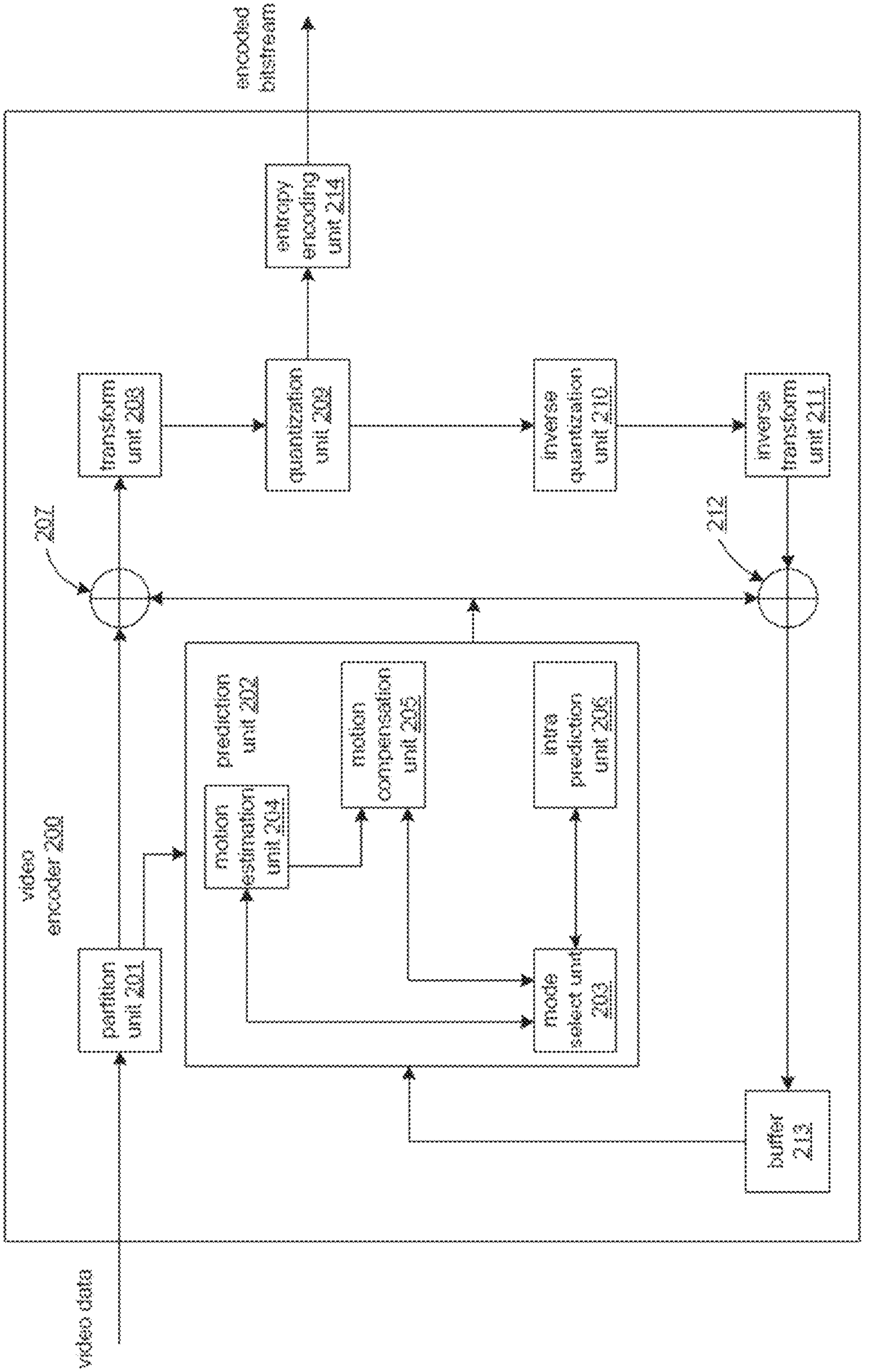
FIG. 17 is a block diagram that illustrates an encoder, in accordance with various examples.

FIG. 17 is a block diagram illustrating an example of video encoder 200, which may be video encoder 114 in the system 100 illustrated in FIG. 16.

Video encoder 200 may be configured to perform any or all of the techniques of this disclosure. In the example of FIG. 17, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a prediction unit 202 which may include a mode select unit 203, a motion estimation unit 204, a motion compensation unit 205 and an intra prediction unit 206, a residual generation unit 207, a transform processing unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, prediction unit 202 may include an intra block copy (IBC) unit. The IBC unit may perform prediction in an IBC mode in which at least one reference picture is a picture where the current video block is located.

Furthermore, some components, such as motion estimation unit 204 and motion compensation unit 205 may be highly integrated, but are represented in the example of FIG. 17 separately for purposes of explanation.

Partition unit 201 may partition a picture into one or more video blocks. Video encoder 200 and video decoder 300 may support various video block sizes.

Mode select unit 203 may select one of the coding modes, intra or inter (e.g., based on error results) and provide the resulting intra- or inter-coded block to a residual generation unit 207 to generate residual block data and to a reconstruction unit 212 to reconstruct the encoded block for use as a reference picture. In some examples, mode select unit 203 may select a combination of intra and inter prediction (CIIP) mode in which the prediction is based on an inter prediction signal and an intra prediction signal. Mode select unit 203 may also select a resolution for a motion vector (e.g., a sub-pixel or integer pixel precision) for the block in the case of inter-prediction.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may do not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector prediction (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the prediction unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 18:
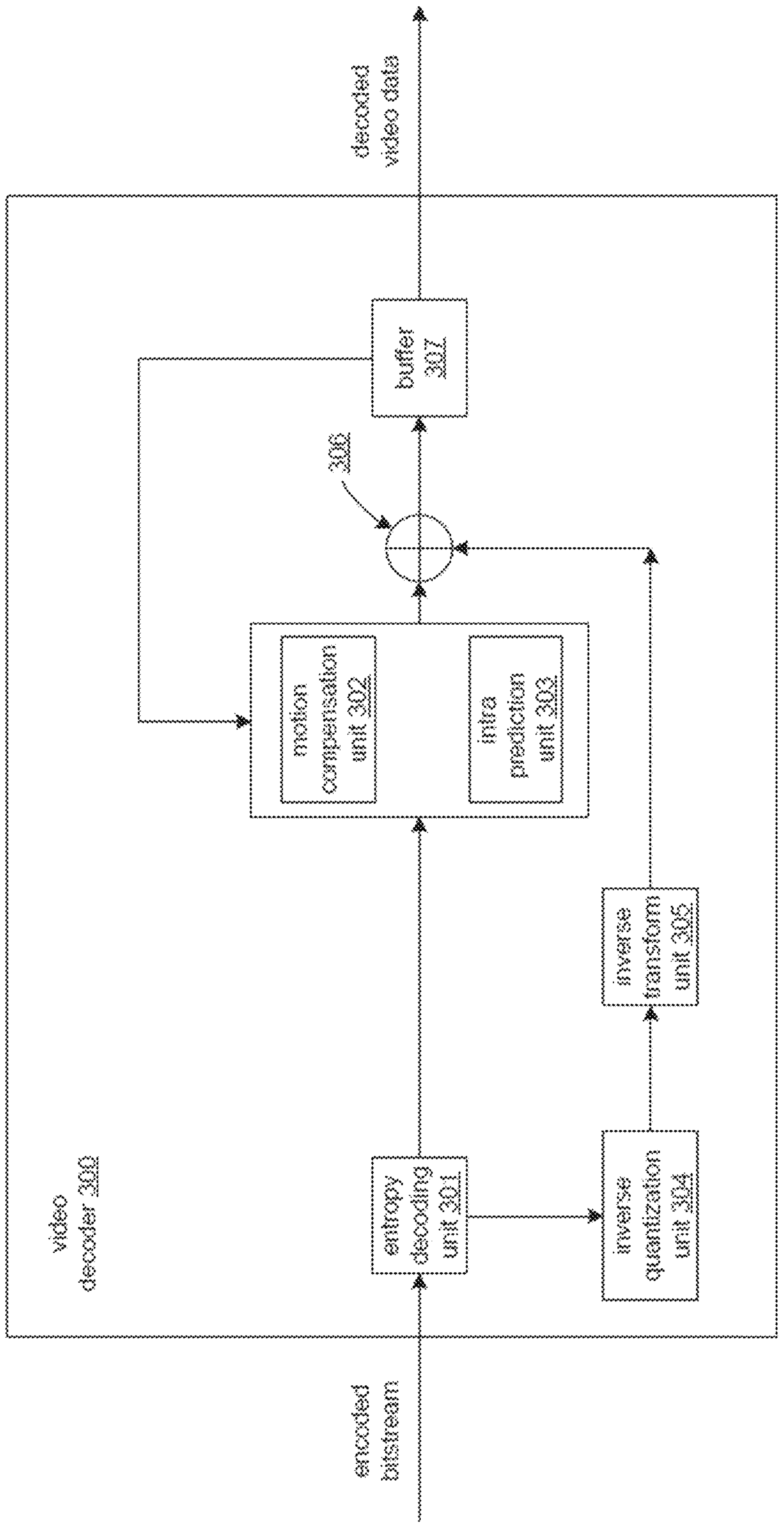
FIG. 18 is a block diagram that illustrates a decoder, in accordance with various examples.

FIG. 18 is a block diagram illustrating an example of video decoder 300 which may be video decoder 124 in the system 100 illustrated in FIG. 16.

The video decoder 300 may be configured to perform any or all of the techniques of this disclosure. In the example of FIG. 18, the video decoder 300 includes a plurality of functional components. The techniques described in this disclosure may be shared among the various components of the video decoder 300. In some examples, a processor may be configured to perform any or all of the techniques described in this disclosure.

In the example of FIG. 18, video decoder 300 includes an entropy decoding unit 301, a motion compensation unit 302, an intra prediction unit 303, an inverse quantization unit 304, an inverse transform unit 305, and a reconstruction unit 306 and a buffer 307. Video decoder 300 may, in some examples, perform a decoding pass generally reciprocal to the encoding pass described with respect to video encoder 200 (FIG. 17).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 20 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 304 inverse quantizes, (e.g., de-quantizes) the quantized video block coefficients provided in the bitstream and decoded by entropy decoding unit 301. Inverse transform unit 305 applies an inverse transform.

Reconstruction unit 306 may sum the residual blocks with the corresponding prediction blocks generated by motion compensation unit 302 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra prediction and also produces decoded video for presentation on a display device.

A listing of solutions preferred by some embodiments is provided next.

The following solutions show example embodiments of techniques discussed in the previous section (e.g., item 1).

Figure 15:
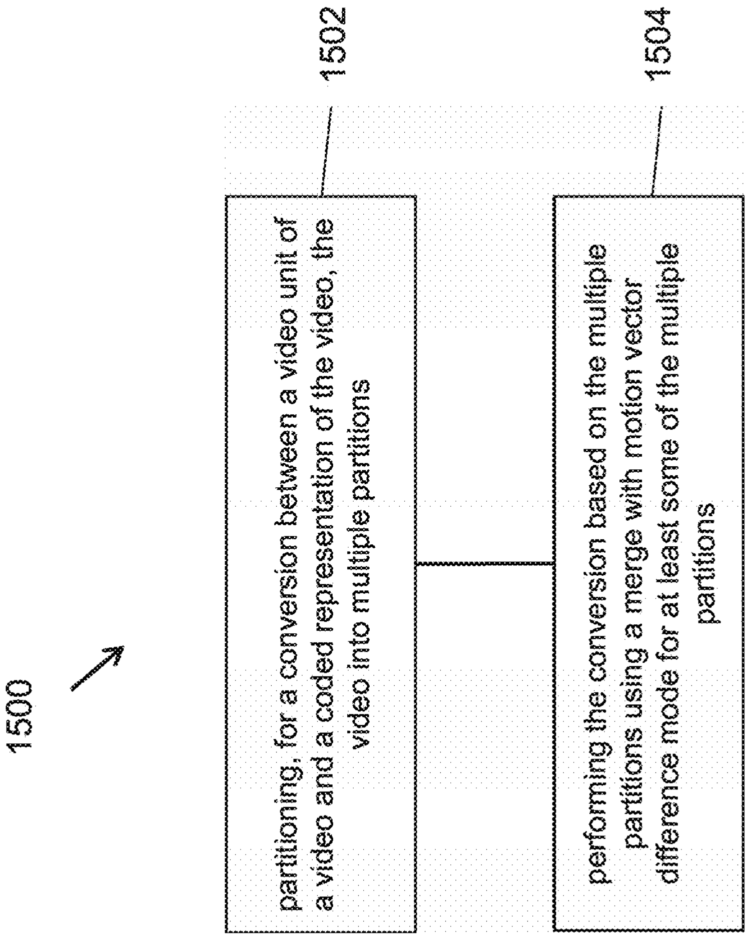
FIG. 15 is a flowchart for an example method of video processing.

1. A method of video processing (e.g., method 1500 shown in FIG. 15), comprising partitioning, for a conversion between a video unit of a video and a coded representation of the video, the video into multiple partitions, and performing the conversion based on the multiple partitions using a merge with motion vector difference mode for at least some of the multiple partitions.
2. The method of solution 1, wherein at least one of the multiple partitions is a non-rectangular partition.
3. The method of any of solutions 1-2, wherein the partitioning uses a triangular partition mode, and wherein the merge with motion vector difference mode uses a triangular partition mode merge candidate as a merge candidate.

The following solutions show example embodiments of techniques discussed in the previous section (e.g., item 2).

4. The method of any of solutions 1-3, wherein the multiple partitions comprise N partitions, where N is an integer greater than or equal to 2, and wherein the coded representation includes at most N motion vector difference values or wherein the conversion uses at most N motion vector difference values.
5. The method of solution 4, wherein the coded representation includes fields indicative of K partitions, where K<N, and wherein one motion vector difference value is shared by more than one of the multiple partitions.

The following solutions show example embodiments of techniques discussed in the previous section (e.g., item 3).

6. The method of solutions 4-5, wherein a field in the coded representation indicates whether at least one of the N motion vector difference values is a non-zero value.
7. The method of solution 6, wherein the field is context coded in the coded representation.

The following solutions show example embodiments of techniques discussed in the previous section (e.g., items 5, 6, 7).

8. The method of any of solutions 4-7, wherein at least one the N motion vector differences is signaled as a syntax element indicating a horizontal component of the motion vector difference.
9. The method of any of solutions 4-7, wherein at least one the N motion vector differences is signaled as a syntax element indicating a vertical component of the motion vector difference.
10. The method of any of solutions 4-7, wherein at least one the N motion vector differences is signaled as a syntax element indicating an absolute value of a horizontal or a vertical component of the motion vector difference.

The following solutions show example embodiments of techniques discussed in the previous section (e.g., item 8).

11. The method of any of solutions 4-7, wherein at least one of the N motion vector differences is derived from another motion vector difference.

The following solutions show example embodiments of techniques discussed in the previous section (e.g., item 9).

12. A method of video processing, comprising: partitioning, for a conversion between a video unit of a video and a coded representation of the video, the video into multiple partitions, and performing the conversion based on the multiple partitions wherein the coded representation comprises fields indicative of motion vector difference values using one or more of two variables corresponding to a direction and a magnitude of the motion vector difference values.
13. The method of solution 12, wherein one of the two variables is a direction variable.
14. The method of solutions 12-13, wherein the magnitude is allowed to have a value belonging to a set.

The following solutions show example embodiments of techniques discussed in the previous section (e.g., item 12).

15. A method of video processing, comprising: partitioning, for a conversion between a video unit of a video and a coded representation of the video, the video into multiple partitions, and performing the conversion based on the multiple partitions wherein the coded representation comprises fields in an order.
16. The method of solution 15, wherein the order comprises motion vector differences occurring before merge candidate indices in the coded representation.
17. The method of solution 15, wherein the order is dependent on a characteristic of the video unit.
18. The method of any of above solutions, wherein the video unit comprises a coding unit.
19. The method of any of above solutions, wherein the video unit comprises video block.
20. The method of any of solutions 1 to 19, wherein the conversion comprises encoding the video into the coded representation.
21. The method of any of solutions 1 to 19, wherein the conversion comprises decoding the coded representation to generate pixel values of the video.
22. A video decoding apparatus comprising a processor configured to implement a method recited in one or more of solutions 1 to 21.
23. A video encoding apparatus comprising a processor configured to implement a method recited in one or more of solutions 1 to 21.
24. A computer program product having computer code stored thereon, the code, when executed by a processor, causes the processor to implement a method recited in any of solutions 1 to 21.
25. A method, apparatus or system described in the present disclosure.

Figure 19:
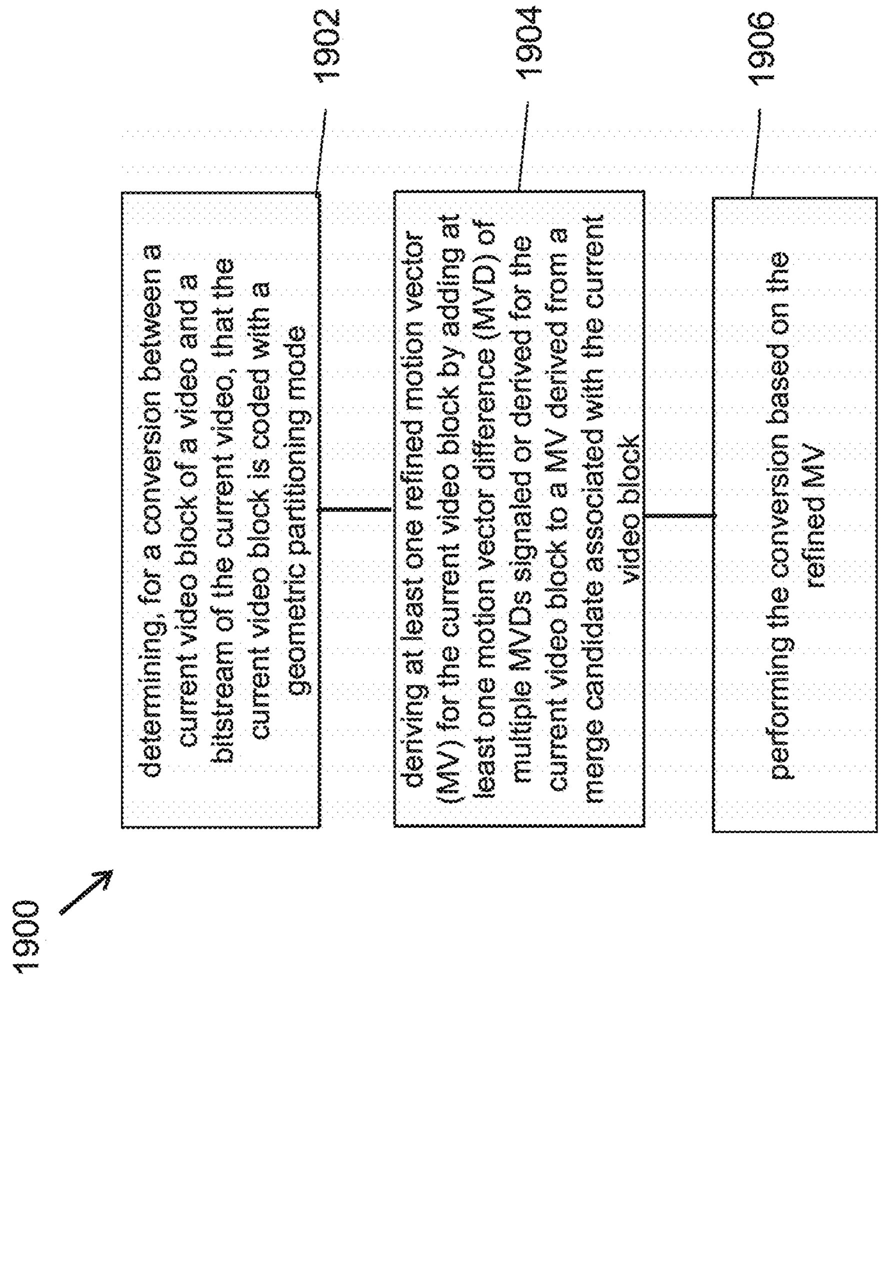
FIG. 19 is a flowchart for an example method of video processing.

FIG. 19 shows a flowchart of an example method for video processing. The method includes determining (1902), for a conversion between a current video block of a video and a bitstream of the current video, that the current video block is coded with a geometric partitioning mode. The method also includes deriving (1904) at least one refined motion vector (MV) for the current video block by adding at least one motion vector difference (MVD) of multiple MVDs signaled or derived for the current video block to a MV derived from a merge candidate associated with the current video block. The method also includes performing (1906) the conversion based on the refined MV.

In some examples, the current video block is a geometric motion vector difference (GMVD) coded block or a Merge with Motion Vector Difference (MMVD) coded block.

In some examples, the geometric partitioning mode includes multiple partition schemes and at least one partition scheme divides the current video block in to two or more partitions, at least one of which is non-square and non-rectangular.

In some examples, the geometric partitioning mode comprises a triangular partitioning mode.

In some examples, the geometric partitioning mode comprises a geometric merge mode.

In some examples, the current video block is partitioned into N partitions, at most N MVDs are signaled or derived for the partitions of the current video block, wherein N>=2.

In some examples, N=2.

In some examples, N MVDs are signaled or derived for the partitions of the current video block, and each MVD corresponds to a specific partition.

In some examples, the MVD corresponding a partition is added to the MV of the partition to obtain a refined MV for the partition, so as to be used in motion compensation for the partition.

In some examples, K MVDs are signaled or derived and at least one MVD corresponds to more than one partition, where K<N.

In some examples, number of MVDs to be signaled is dependent on decoded information including at least one of block dimension, low delay check flag, prediction direction or reference picture lists associated with the N partitions.

In some examples, the number of MVDs is included in the bitstream.

In some examples, multiple MVDs are used by one partition.

In some examples, multiple MVDs are added to the MV of the partition to obtain a refined MV for the partition.

In some examples, a first message is included in the bitstream to indicate whether at least one of the multiple MVDs is not equal to zero.

In some examples, the first message is a flag.

In some examples, the first message is context-coded or bypass-coded in arithmetic coding.

In some examples, the first message is coded with at least one context which is the same as the syntax element to indicate whether MMVD is applied.

In some examples, information related to the multiple MVDs is included in the bitstream only if the first message indicates that at least one of the multiple MVDs is not equal to zero.

In some examples, a second message for at least one of the multiple MVDs is included in the bitstream to indicate whether the MVD is equal to zero, where the second message is a non-zero message.

In some examples, at least one binarized bin of the second message is context-coded in arithmetic coding.

In some examples, at least one binarized bin of the second message is bypass-coded in arithmetic coding.

In some examples, the second message is coded with at least one context which is the same as the syntax element to indicate whether MMVD is applied.

In some examples, information associated with an MVD is included in the bitstream only if the second message indicates that the MVD is not equal to zero.

In some examples, at least one of the multiple MVDs are included in the bitstream with a syntax element indicating horizontal component of the MVD, or at least one of the multiple MVDs are included in the bitstream with a syntax element indicating vertical component of the MVD.

In some examples, at least one of the multiple MVDs are included in the bitstream with a syntax element indicating the absolute value(s) of horizontal component and/or vertical component of the MVD.

In some examples, a second MVD is derived depending on a first MVD which is signaled or derived before signaling or deriving the second MVD.

In some examples, the MVDs used in GMVD is represented by two variables, the first variable is direction and the second variable is magnitude which is denoted by D.

In some examples, at least one of the multiple MVDs are included in the bitstream with a syntax element indicating direction of the MVD.

In some examples, the directions include at least one of:

1) the MVD is in a form of (1, 0)*D, wherein D is no smaller than 0;
2) the MVD is in a form of (−1, 0)*D, wherein D is no smaller than 0;
3) the MVD is in a form of (0, 1)*D, wherein D is no smaller than 0;
4) the MVD is in a form of (0, −1)*D, wherein D is no smaller than 0;
5) the MVD is in a form of (1, 1)*D, wherein D is no smaller than 0;
6) the MVD is in a form of (−1, 1)*D, wherein D is no smaller than 0;
7) the MVD is in a form of (1, −1)*D, wherein D is no smaller than 0; and
8) the MVD is in a form of (−1, −1)*D, wherein D is no smaller than 0.

In some examples, the directions include at least one of:

1) the MVD is in a form of (1, 0)*D, wherein D is no smaller than 0;
2) the MVD is in a form of (−1, 0)*D, wherein D is no smaller than 0;
3) the MVD is in a form of (0, 1)*D, wherein D is no smaller than 0; and 4) the MVD is in a form of (0, −1)*D, wherein D is no smaller than 0.

In some examples, the direction is binarized with a fixed length coding, or a unary coding, or an exponential-Golomb coding.

In some examples, D is larger than 0.

In some examples, for GMVD-coded blocks, indication of an MVD magnitude is denoted by D which is signaled or derived.

In some examples, D is restricted to be in a candidate set.

In some examples, the candidate set comprises a zero.

In some examples, the candidate set comprises ¼-sample, ½-sample, or other fractional samples.

In some examples, the candidate set comprises 1-sample, 2-sample, 4-sample, 8-sample, 16-sample, 32-sample, 64-sample, 128-sample or other 2N samples.

In some examples, the candidate set comprises 3-sample, 6-sample, 12-sample, 24-sample, or other integer samples.

In some examples, the candidate set is {¼-sample, ½-sample, 1-sample, 2-sample, 4-sample, 8-sample, 16-sample, 32-sample}.

In some examples, the candidate set is {¼-sample, ½-sample, 1-sample, 2-sample, 3-sample, 4-sample, 6-sample, 8-sample, 16-sample}.

In some examples, the candidate set is set equal to that used for MMVD-coded blocks in the same video processing unit, where the video processing unit includes at least one of slice, tile, sub-picture, picture or sequence.

In some examples, the candidate includes more candidates in addition to those used for MMVD-coded blocks in the same video processing unit, where the video processing unit includes at least one of slice, tile, sub-picture, picture or sequence.

In some examples, at least one candidate in the candidate set is different from those used for MMVD-coded blocks in the same video processing unit, where the video processing unit includes at least one of slice, tile, sub-picture, picture or sequence.

In some examples, at least one candidate in the candidate set is equal to one of those used for MMVD-coded blocks in the same video processing unit, where the video processing unit includes at least one of slice, tile, sub-picture, picture or sequence.

In some examples, instead of signaling the D directly, index of the selected MVD magnitude in the candidate set is signaled.

In some examples, multiple candidate sets of MVDs are be pre-defined, and one of them is selected for encoding/decoding current GMVD-coded block.

In some examples, the selection is dependent on a message signaled at at least one of slice level, picture level or sequence level.

In some examples, the message signaled in at least one of slice header, picture header, Picture Parameter Set (PPS) or Sequence Parameter Set (SPS).

In some examples, the selection is dependent on the same message used for MMVD coded blocks, which is sps_fpel_mmvd_enabled_flag.

In some examples, D is binarized as a fixed length coding, or a unary coding, or an exponential-Golomb coding.

In some examples, at least one binarized bin of D is context-coded in arithmetic coding.

In some examples, at least one binarized bin of D is bypass-coded in arithmetic coding.

In some examples, the first bin of D is context-coded in arithmetic coding.

In some examples, other bins of D are bypass-coded in arithmetic coding.

In some examples, the derived MVD from D is further modified before being used to derive a final MVD for a partition.

In some examples, D is modified as D=D<<S, S is an integer.

In some examples, S=2.

In some examples, whether to apply the modification is deduced implicitly.

In some examples, the modification is applied if width and/or height of current picture is larger than a threshold.

In some examples, whether to apply the modification depends on a signaled message which is at least one of sequence level, picture level, slice level, sub-picture level, tile level, CTU-row level, or CTU-level.

In some examples, the message is signaled in SPS and/or sequence header, in PPS and/or the picture header or in slice header.

In some examples, the same message including sps_fpel_mmvd_enabled_flag and/or pic_fpel_mmvd_enabled_flag is used to control both MMVD and GMVD.

In some examples, separate messages are signaled to control MMVD and GMVD, respectively.

In some examples, the current video block is partitioned into two partitions by a triangular partitioning mode or a geometric merge mode, and two MVDs are signaled or derived for the two partitions.

In some examples, the MV for a partition is calculated as a sum of the MV derived by the triangular partitioning mode or the geometric merge mode for the partition and the MVD for the partition.

In some examples, a weighted sum process of two motion compensations with the two MVs for the two partitions are performed in the same way as the triangular partitioning mode or the geometric merge mode.

In some examples, a MV storage process of the two MVs for the two partitions are performed in the same way as the triangular partitioning mode or the geometric merge mode.

In some examples, whether to signal or derive the multiple MVDs depends on one or more conditions.

In some examples, whether to signal or derive the proposed multiple MVDs depends on whether the geometric merge mode is enabled for the current video block.

In some examples, the multiple MVDs are inferred to be zero if they are not signaled or derived.

In some examples, whether to enable GMVD is signaled at least one of sequence level, picture level, slice level, sub-picture level, tile level, CTU-row level, or CTU-level.

In some examples, whether to enable GMVD is signaled in SPS and/or sequence header, in PPS and/or the picture header or in slice header.

In some examples, whether to enable GMVD is signaled under the condition that the triangular partitioning mode or the geometric merge mode is enabled.

In some examples, whether to signal or derive the multiple MVDs depends on block width (W) and/or block height (H) of the current video block.

In some examples, the multiple MVDs is not be signaled or derived if at least one or any combinations of the following conditions are satisfied:

i. $W >= T1, T1 = 64;$ ii. $H >= T2, T2 = 64;$ iii. $W >= T3 * H, T3 = 4;$ iv. $H >= T4 * H, T4 = 8;$ v. $W <= T5, T5 = 8;$ vi. $H <= T6, T6 = 8;$ vii. $W * H >= T7, T7 = 2048;$ vii. $W * H <= T8, T8 = 64;$ viii. $W == T9$ or $H = T10, T9 = T10 = 4;$ x. $W/H > T11$ or $\max(W, H)/\min(W, H) >= T11;$ xi. $W/H < T11$ or $\max(W, H)/\min(W, H) < T11.$ In some examples, whether to signal or derive the multiple MVDs depends on indices of merge candidates.

In some examples, the index of the merge candidate is larger than a predetermined value.

In some examples, for GMVD-coded blocks, MVDs are signaled before indices of merge candidates.

In some examples, the index of the merge candidate is signaled depending on whether the multiple MVDs are signaled or derived.

In some examples, how to signal the indices of the merge candidate for GMVD-coded blocks depends on usage of GMVD.

In some examples, a maximum index of the merge candidate that can be signaled is reduced if the multiple MVDs are signaled or derived.

In some examples, the conversion includes encoding the current video block into the bitstream.

In some examples, the conversion includes decoding the current video block from the bitstream.

In some examples, the conversion includes generating the bitstream from the current video block; the method further comprising: storing the bitstream in a non-transitory computer-readable recording medium.

In some examples, an apparatus for processing video data comprising a processor and a non-transitory memory with instructions thereon, wherein the instructions upon execution by the processor, cause the processor to: determining, for a conversion between a current video block of a video and a bitstream of the current video, that the current video block is coded with a geometric partitioning mode; deriving at least one refined motion vector (MV) for the current video block by adding at least one motion vector difference (MVD) of multiple MVDs signaled or derived for the current video block to a MV derived from a merge candidate associated with the current video block; and performing the conversion based on the refined MV.

In some examples, a non-transitory computer readable media storing instructions that cause a processor to: determining, for a conversion between a current video block of a video and a bitstream of the current video, that the current video block is coded with a geometric partitioning mode; deriving at least one refined motion vector (MV) for the current video block by adding at least one motion vector difference (MVD) of multiple MVDs signaled or derived for the current video block to a MV derived from a merge candidate associated with the current video block; and performing the conversion based on the refined MV.

In some examples, a non-transitory computer readable media storing a bitstream of a video which is generated by a method performed by a video processing apparatus, wherein the method comprises: determining, for a conversion between a current video block of a video and a bitstream of the current video, that the current video block is coded with a geometric partitioning mode; deriving at least one refined motion vector (MV) for the current video block by adding at least one motion vector difference (MVD) of multiple MVDs signaled or derived for the current video block to a MV derived from a merge candidate associated with the current video block; and generating the bitstream from the current video block based on the refined MV.

Figure 20:
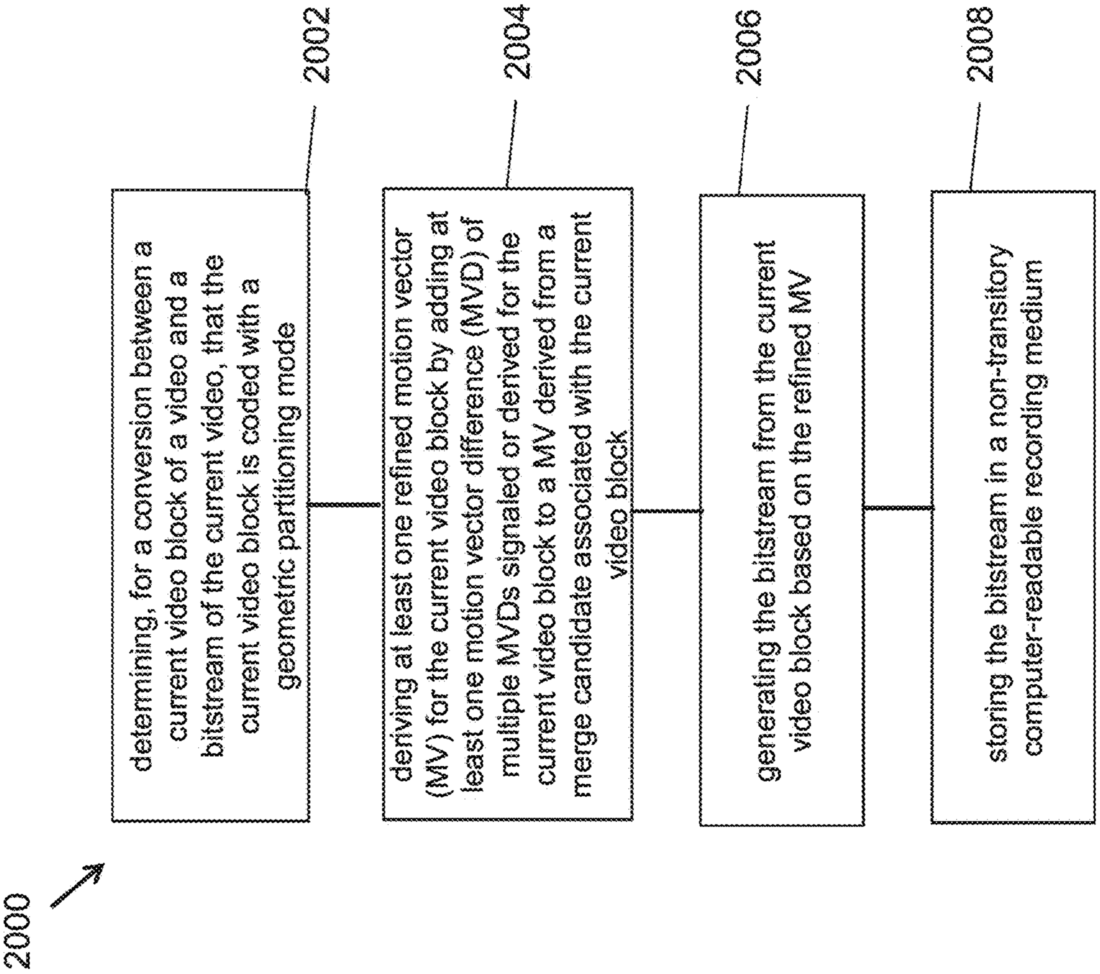
FIG. 20 is a flowchart for an example method for storing bitstream of a video.

FIG. 20 shows a flowchart of an example method for storing bitstream of a video. The method includes determining (2002), for a conversion between a current video block of a video and a bitstream of the current video, that the current video block is coded with a geometric partitioning mode. The method also includes deriving (2004) at least one refined motion vector (MV) for the current video block by adding at least one motion vector difference (MVD) of multiple MVDs signaled or derived for the current video block to a MV derived from a merge candidate associated with the current video block. The method also includes generating (2006) the bitstream from the current video block based on the refined MV. The method also includes storing (2008) the bitstream in a non-transitory computer-readable recording medium.

Figure 21:
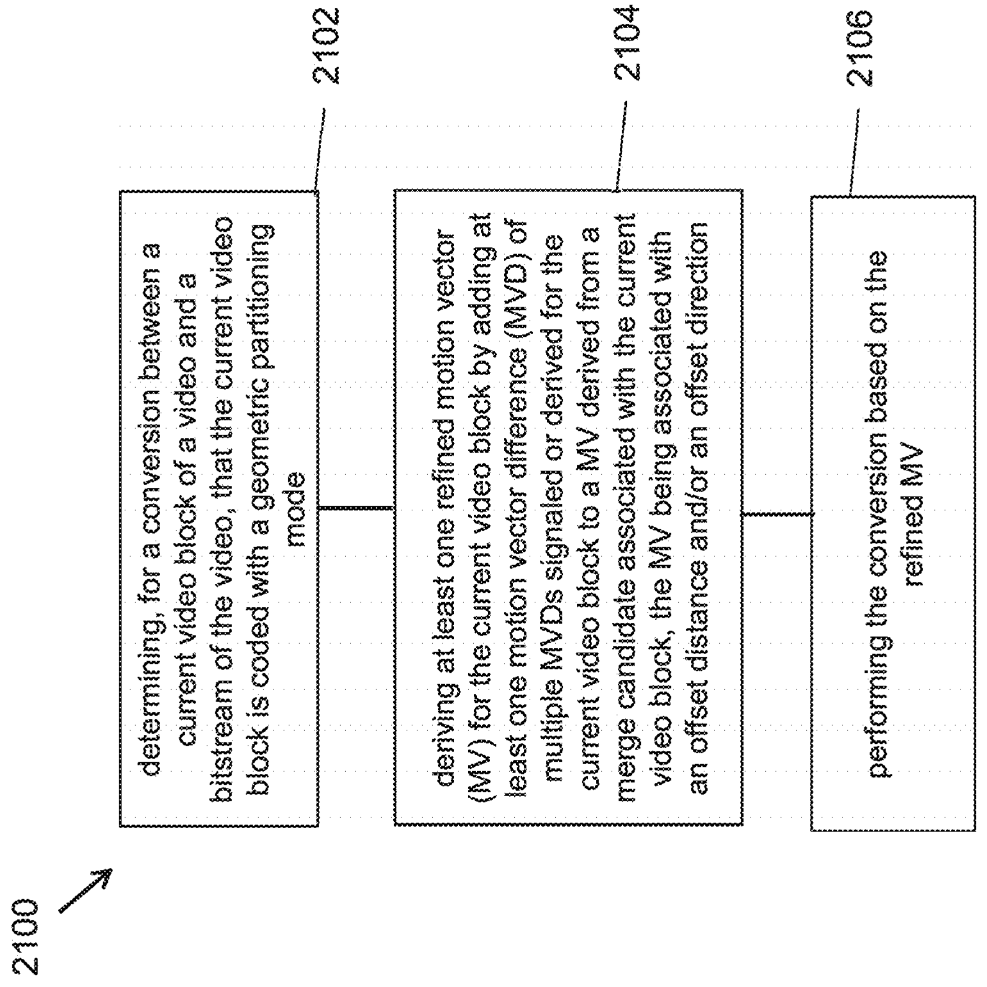
FIG. 21 is a flowchart for an example method of video processing.

FIG. 21 shows a flowchart of an example method for video processing. The method includes determining (2102), determining, for a conversion between a current video block of a video and a bitstream of the video, that the current video block is coded with a geometric partitioning mode. The method also includes deriving (2104) at least one refined motion vector (MV) for the current video block by adding at least one motion vector difference (MVD) of multiple MVDs signaled or derived for the current video block to a MV derived from a merge candidate associated with the current video block, the MV being associated with an offset distance and/or an offset direction. The method also includes performing (2106) the conversion based on the refined MV.

In some examples, the current video block is a geometric motion vector difference coded block or a merge with motion vector difference coded block.

In some examples, the geometric partitioning mode includes multiple partition schemes and in at least one partition scheme, the current video block comprises two or more partitions.

In some examples, at least one of the two or more partitions is non-square and non-rectangular.

In some examples, the geometric partitioning mode comprises a triangular partitioning mode.

In some examples, the geometric partitioning mode comprises a geometric merge mode.

In some examples, a same lookup table is used to derive the offset distance from a distance index for a geometric motion vector difference and a merge with motion vector difference.

In some examples, a same lookup table is used to derive the offset direction from a direction index for a geometric motion vector difference and a merge with motion vector difference.

Figure 22:
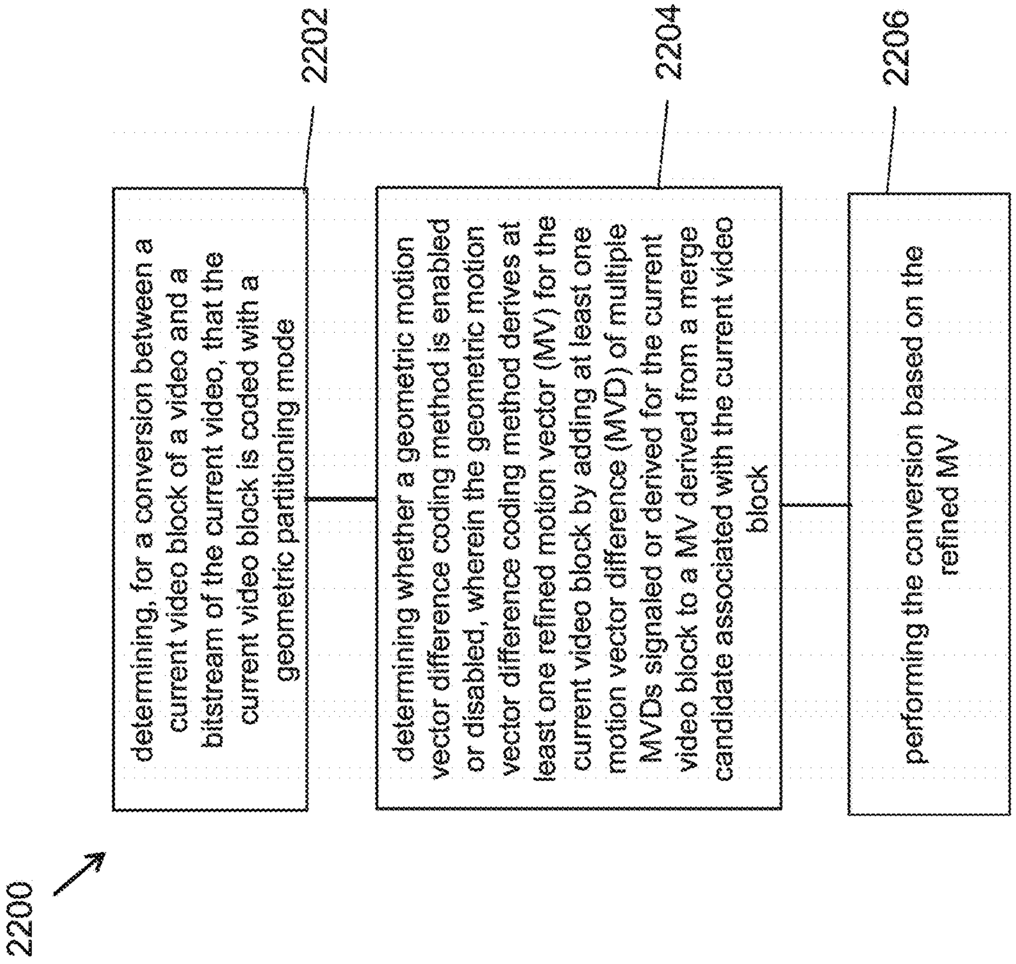
FIG. 22 is a flowchart for an example method of video processing.

FIG. 22 shows a flowchart of an example method for video processing. The method includes determining (2202), for a conversion between a current video block of a video and a bitstream of the video, that the current video block is coded with a geometric partitioning mode. The method also includes determining (2204) whether a geometric motion vector difference coding method is enabled or disabled. The geometric motion vector difference coding method derives at least one refined motion vector (MV) for the current video block by adding at least one motion vector difference (MVD) of multiple MVDs signaled or derived for the current video block to a MV derived from a merge candidate associated with the current video block. The method also includes performing (2206) the conversion based on the refined MV.

In some examples, the geometric partitioning mode includes multiple partition schemes and in at least one partition scheme, the current video block comprises two or more partitions.

In some examples, at least one of the two or more partitions is non-square and non-rectangular.

In some examples, for different partitions within the current video block, whether the geometric motion vector difference coding method is enabled or disabled is determined in an explicit way or an implicit way.

In some examples, a first syntax element is conditionally signaled to indicate whether the geometric motion vector difference coding method is applied to the current video block or whether at least one of the MVDs for a partition of the current video block is non-zero MVD.

In some examples, when the first syntax element indicates the geometric motion vector difference coding method is applied, how to signal information associated with the MVD and/or geometric motion vector difference coding method on/off controlling information depends on a partition index or partition location relative to the current video block.

In some examples, for the first partition in coding order, the geometric motion vector difference coding method on/off controlling information or whether the MVD is zero for both horizontal component and vertical component is signaled.

In some examples, for the second partition in coding order, the geometric motion vector difference coding method on/off controlling information or whether MVD is zero for both horizontal component and vertical component is not signaled if the geometric motion vector difference coding method is off for the first partition.

In some examples, the geometric motion vector difference coding method is inferred to be applied to the second partition.

In some examples, indicator of enabling/disabling the geometric motion vector difference coding method is signaled in high level including sequence level and/or low level including picture level, slice level.

In some examples, the indicator of enabling/disabling the geometric motion vector difference coding method is signaled in at least one of sequence parameter set (SPS), picture parameter set (PPS), picture header or slice header.

In some examples, the indicator is conditionally signaled according to whether a geometric merge mode is enabled, and/or slice type or picture type is B type, and/or whether the sequence allows at least one B slice/picture.

In some examples, indicator of enabling/disabling the geometric motion vector difference coding method is implicitly derived without being signaled.

In some examples, the indicator of enabling/disabling the geometric motion vector difference coding method is derived from whether a merge with motion vector difference coding method and/or a geometric merge mode is enabled.

In some examples, if the merge with motion vector difference coding method and the geometric merge mode are enabled, the geometric motion vector difference coding method is enabled.

In some examples, if the merge with motion vector difference coding method is disabled, the geometric motion vector difference coding method is disabled.

In some examples, if the geometric merge mode is disabled, the geometric motion vector difference coding method is disabled.

In some examples, the conversion includes encoding the current video block into the bitstream.

In some examples, the conversion includes decoding the current video block from the bitstream.

In some examples, the conversion includes generating the bitstream from the current video block; the method further comprising: storing the bitstream in a non-transitory computer-readable recording medium.

In some examples, a non-transitory computer readable media storing instructions that cause a processor to implement the above method is provided.

In some examples, a non-transitory computer readable media storing a bitstream of a video which is generated by the above method is provided.

Figure 23:
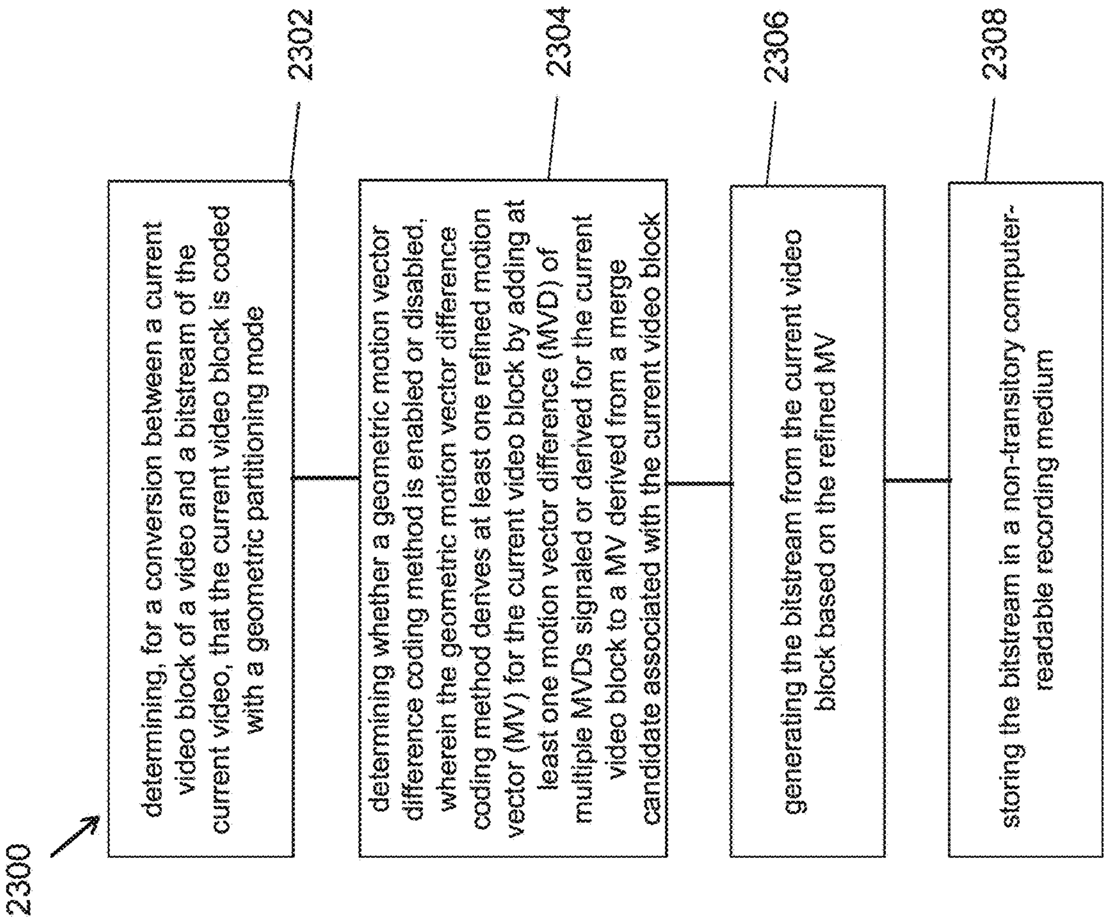
FIG. 23 is a flowchart for an example method for storing bitstream of a video.

FIG. 23 shows a flowchart of an example method for storing bitstream of a video. The method includes determining (2302), for a conversion between a current video block of a video and a bitstream of the video, that the current video block is coded with a geometric partitioning mode. The method also includes determining (2304) whether a geometric motion vector difference coding method is enabled or disabled. The geometric motion vector difference coding method derives at least one refined motion vector (MV) for the current video block by adding at least one motion vector difference (MVD) of multiple MVDs signaled or derived for the current video block to a MV derived from a merge candidate associated with the current video block. The method also includes generating (2306) the bitstream from the current video block based on the refined MV. The method also includes storing (2308) the bitstream in a non-transitory computer-readable recording medium.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, such as, one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, for example, code that constitutes processor firmware, a protocol stack, a database management system, an operating system, or a combination of one or more of them. A propagated signal is an artificially generated signal, for example, a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, for example, a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto optical disks; and compact disc, read-only memory (CD ROM) and digital versatile disc read-only memory (DVD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:

determining, for a conversion between a current video block of a video and a bitstream of the video, that the current video block is coded with a geometric partitioning mode;

deriving at least one refined motion vector (MV) for the current video block by adding at least one motion vector difference (MVD) of multiple MVDs signaled or derived for the current video block to a MV derived from a merge candidate associated with the current video block, the MV being associated with an offset distance and/or an offset direction;

determining whether a geometric motion vector difference coding method is enabled or disabled, wherein the geometric motion vector difference coding method derives the at least one refined MV; and performing the conversion based on the refined MV, wherein a first syntax element is conditionally signaled to indicate whether a geometric motion vector difference coding method is applied to the current video block or whether at least one of the multiple MVDs for a partition of the current video block is a non-zero MVD, and wherein when the first syntax element indicates that the geometric motion vector difference coding method is applied, how to signal information associated with the MVD and/or geometric motion vector difference coding method on/off controlling information depends on a partition index or a partition location relative to the current video block.

2. The method of claim 1, wherein the current video block is a geometric motion vector difference coded block or a merge with motion vector difference coded block.

3. The method of claim 2, wherein a same lookup table is used to derive the offset distance from a distance index for a geometric motion vector difference and a merge with motion vector difference.

4. The method of claim 2, wherein a same lookup table is used to derive the offset direction from a direction index for a geometric motion vector difference and a merge with motion vector difference.

5. The method of claim 1, wherein the geometric partitioning mode includes multiple partition schemes and in at least one partition scheme, the current video block comprises two or more partitions, wherein at least one of the two or more partitions is non-square and non-rectangular.

6. The method of claim 1, wherein the geometric partitioning mode comprises a triangular partitioning mode or a geometric merge mode.

7. The method of claim 1, wherein for different partitions within the current video block, whether the geometric motion vector difference coding method is enabled or disabled is determined in an explicit way or an implicit way.

8. The method of claim 1, wherein an indicator of enabling/disabling the geometric motion vector difference coding method is signaled in a high level including a sequence level and/or a low level including a picture level and a slice level.

9. The method of claim 8, wherein the indicator of enabling/disabling the geometric motion vector difference coding method is signaled in at least one of a sequence parameter set (SPS), a picture parameter set (PPS), a picture header or a slice header;

wherein the indicator is conditionally signaled according to whether a geometric merge mode is enabled, and/or a slice type or a picture type is a B type, and/or whether a sequence allows at least one B slice/picture.

10. The method of claim 1, wherein, for a first partition in a coding order, the geometric motion vector difference coding method on/off controlling information or whether the MVD is zero for both a horizontal component and a vertical component is signaled;

wherein, for a second partition in the coding order, the geometric motion vector difference coding method on/off controlling information or whether the MVD is zero for both the horizontal component and the vertical component is not signaled when the geometric motion vector difference coding method is off for the first partition;

wherein the geometric motion vector difference coding method is inferred to be applied to the second partition.

11. The method of claim 1, wherein an indicator of enabling/disabling the geometric motion vector difference coding method is implicitly derived without being signaled;

wherein the indicator of enabling/disabling the geometric motion vector difference coding method is derived from whether a merge with motion vector difference coding method and/or a geometric merge mode is enabled.

12. The method of claim 11, wherein: when the merge with motion vector difference coding method and the geometric merge mode are enabled, the geometric motion vector difference coding method is enabled; or when the merge with motion vector difference coding method is disabled, the geometric motion vector difference coding method is disabled; or when the geometric merge mode is disabled, the geometric motion vector difference coding method is disabled.

13. The method of claim 1, wherein the conversion includes encoding the current video block into the bitstream.

14. The method of claim 1, wherein the conversion includes decoding the current video block from the bitstream.

15. The method of claim 1, wherein the conversion includes generating the bitstream from the current video block; the method further comprises:

storing the bitstream in a non-transitory computer-readable recording medium.

16. An apparatus for processing video data comprising a processor and a non-transitory memory with instructions thereon, wherein the instructions upon execution by the processor, cause the processor to:

determine, for a conversion between a current video block of a video and a bitstream of the video, that the current video block is coded with a geometric partitioning mode;

derive at least one refined motion vector (MV) for the current video block by adding at least one motion vector difference (MVD) of multiple MVDs signaled or derived for the current video block to a MV derived from a merge candidate associated with the current video block, the MV being associated with an offset distance and/or an offset direction;

determine whether a geometric motion vector difference coding method is enabled or disabled, wherein the geometric motion vector difference coding method derives the at least one refined MV; and perform the conversion based on the refined MV, wherein a first syntax element is conditionally signaled to indicate whether a geometric motion vector difference coding method is applied to the current video block or whether at least one of the multiple MVDs for a partition of the current video block is a non-zero MVD, and wherein when the first syntax element indicates that the geometric motion vector difference coding method is applied, how to signal information associated with the MVD and/or geometric motion vector difference coding method on/off controlling information depends on a partition index or a partition location relative to the current video block.

17. A method for storing a bitstream of a video, comprising:

determining that a current video block of the video is coded with a geometric partitioning mode;

deriving at least one refined motion vector (MV) for the current video block by adding at least one motion vector difference (MVD) of multiple MVDs signaled or derived for the current video block to a MV derived from a merge candidate associated with the current video block, the MV being associated with an offset distance and/or an offset direction;

determining whether a geometric motion vector difference coding method is enabled or disabled, wherein the geometric motion vector difference coding method derives the at least one refined MV;

generating the bitstream of the video based on the refined MV; and storing the generated bitstream in a non-transitory computer-readable recording medium, wherein a first syntax element is conditionally signaled to indicate whether a geometric motion vector difference coding method is applied to the current video block or whether at least one of the multiple MVDs for a partition of the current video block is a non-zero MVD, and wherein when the first syntax element indicates that the geometric motion vector difference coding method is applied, how to signal information associated with the MVD and/or geometric motion vector difference coding method on/off controlling information depends on a partition index or a partition location relative to the current video block.

* * * * *